(12) United States Patent
Araki et al.

(10) Patent No.: US 6,901,205 B2
(45) Date of Patent: May 31, 2005

(54) FLUORINE-CONTAINING MATERIAL FOR OPTICAL WAVEGUIDE

(75) Inventors: Takayuki Araki, Settsu (JP); Yoshito Tanaka, Settsu (JP); Mihoko Ohashi, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 10/654,911

(22) Filed: Sep. 5, 2003

(65) Prior Publication Data

US 2004/0052496 A1 Mar. 18, 2004

Related U.S. Application Data

(63) Continuation-in-part of application No. PCT/JP02/01771, filed on Feb. 27, 2002.

(30) Foreign Application Priority Data

Mar. 8, 2001 (JP) ........................................ 2001-064772

(51) Int. Cl.[7] .................................................. G02B 6/10
(52) U.S. Cl. ........................ 385/145; 385/129; 385/143; 430/321
(58) Field of Search ................................ 385/129–132, 385/141–145; 430/270.1, 290, 321

(56) References Cited

U.S. PATENT DOCUMENTS

| | | | | |
|---|---|---|---|---|
| 4,841,093 A | * | 6/1989 | Tamaru et al. | 560/65 |
| 5,061,770 A | * | 10/1991 | Tamaru et al. | 526/247 |
| 5,175,207 A | * | 12/1992 | Tamaru et al. | 525/44 |
| 6,555,288 B1 | * | 4/2003 | Xu et al. | 430/270.1 |

FOREIGN PATENT DOCUMENTS

| | | |
|---|---|---|
| CN | 1277677 A | 12/2000 |
| JP | 9-235322 A | 9/1997 |
| WO | WO 99/23514 | 5/1999 |

OTHER PUBLICATIONS

International Search Report for PCT/JP02/01771 dated Jun. 11, 2002.
English translation of the International Preliminary Examination Report for PCT/JP02/01771 dated Apr. 22, 2003.

* cited by examiner

Primary Examiner—John D. Lee
(74) Attorney, Agent, or Firm—Sughrue Mion, PLLC

(57) ABSTRACT

There is provided a material which can give a high elasticity and heat resistance to an optical waveguide member by photo-curing while maintaining transparency in a near infrared region and further makes it possible to use a film forming process by a spin coating method and a process for producing a waveguide by photolithograph, to obtain a waveguide having a large area and to produce an optical waveguide having reduced water absorption, and further there can be provided an optical waveguide member and an optical waveguide device. Namely, there are provided a fluorine-containing optical waveguide material comprising a curable fluorine-containing prepolymer (I) which is a non-crystalline polymer having a fluorine content of not less than 25% by weight and has a carbon-carbon double bond in a polymer side chain and/or at an end of a polymer trunk chain, an optical waveguide member which is a cured article of the optical waveguide material and an optical waveguide device comprising the optical waveguide member.

28 Claims, 3 Drawing Sheets

FLUORINE-CONTAINING MATERIAL FOR OPTICAL WAVEGUIDE

CROSS-REFERENCE TO RELATED APPLICATION

This is a continuation-in-part of PCT international application No. PCT/JP02/01771 filed on Feb. 27, 2002 pending.

BACKGROUND OF THE INVENTION

The present invention relates to a fluorine-containing material for an optical waveguide which is produced by curing a fluorine-containing prepolymer having a carbon-carbon double bond in its molecular chain, a member obtained from a cured article of the fluorine-containing material for an optical waveguide and an optical waveguide device produced by using the cured article on at least one of a core portion and a clad portion of the device.

Various optical parts have been developed aiming at a high grade optical communication system and economization thereof. Particularly an attention is directed to an optical waveguide as a basic technology for realizing a high density optical interconnection and a waveguide type optical device. Generally optical waveguide materials are required to have characteristics such as easiness in production of a waveguide, controllability of transparency in a region of near infrared wavelength, heat resistance and water resistance.

At present quartz is used most as a material for an optical waveguide. Quartz is high in transparency at a wavelength of from 1,300 to 1,550 nm in a near infrared region and is low in light loss. However there is a problem that a production process is complicated and a waveguide having a large area is difficult to produce. Therefore it is difficult to produce a waveguide type optical device which is excellent in economy and can be used widely for various purposes.

On the other hand, in case of an optical waveguide obtained from a high molecular weight material, since a process for forming a film with a spin coater can be adopted, the waveguide can be produced by an easy process and its area can be made large. However since conventional transparent resin materials such as polystyrene, acrylic resin and polyimide have a large absorption in the above-mentioned near infrared region (poor transparency), a light loss is large and it is difficult to use for the waveguide practically. A trial has been made to reduce light loss by replacing hydrogen in those resins with heavy oxygen (D) or fluorine (F). As a result, though optical characteristics can be improved, it was found that those characteristics were lowered significantly due to water absorption with a lapse of time. Namely, an absorption of light in a near infrared region is increased due to water, thereby increasing a transmission loss.

There has been proposed a non-crystalline fluorine-containing perfluoro polymer having a ring structure as a high molecular weight material which has good transparency in a near infrared region, is relatively low in light loss and has a low water absorption (JP4-190202A, JP2000-81519A, etc.).

Such a non-crystalline fluorine-containing polymer has no problem with transparency, but is low in a glass transition temperature and has a problem with heat resistance. In case of a system where the glass transition temperature was sufficiently increased by changing the structure and proportion of its components, the polymer became fragile and there was a problem that cracking occurred in a process of forming a waveguide. Also in case of the non-crystalline fluorine-containing perfluoro polymer, a range of controllable refractive index is narrow and there is a big restriction in designing of a core-clad type waveguide. For example, when the polymer is used on the core portion of a waveguide, since there is no proper clad material from the viewpoint of refractive index, as mentioned in JP2000-81519A, it is necessary to blend a compound having a high refractive index to the core portion. In case of such a core material, there is a disadvantage that the blended high refractive index component is re-dispersed due to a factor such as an external environmental, which causes non-uniformity of a refractive index inside the core and becomes an influential factor of a transmission loss. As mentioned above, all the problems with the material for a waveguide have not been solved and a novel material for a waveguide which can solve those problems is desired.

SUMMARY OF THE INVENTION

An object of the present invention is to provide a fluorine-containing material for an optical waveguide which can realize a high elasticity and heat resistance of the optical waveguide by the use of a specific fluorine-containing prepolymer and photo-curing while maintaining transparency in a near infrared region (hereinafter referred to as "near infrared transparency").

Also an object of the present invention is to provide a material for a waveguide which makes it possible to use a film forming process by a spin coating method, to use a process for producing a waveguide by photolithography, to obtain a large area and to reduce water absorption while maintaining a near infrared transparency.

Further an object of the present invention is to provide an optical waveguide member and optical waveguide device which are produced using the above-mentioned material.

The present inventors have made intensive studies to achieve the above-mentioned objects and have found a non-crystalline fluorine-containing prepolymer having a carbon-carbon double bond in the polymer side chain or at an end of the polymer trunk chain and have found that by the use of the prepolymer, a cured article having high heat resistance can be obtained without lowering near infrared transparency.

Further the present inventors have found that a cured film obtained from a specific fluorine-containing prepolymer having a carbon-carbon double bond at an end of its side chain is useful as a material for an optical waveguide which has both of near infrared transparency and heat resistance.

Based on those findings, the present inventors have completed the present invention.

The first of the present invention relates to a fluorine-containing material for an optical waveguide comprising a fluorine-containing prepolymer (I) which is a non-crystalline polymer having a fluorine content of not less than 25% by weight and has an ethylenic carbon-carbon double bond in the polymer side chain and/or at an end of the polymer trunk chain.

Example of the fluorine-containing prepolymer (I) which is used suitably in the present invention is a fluorine-containing polymer having a number average molecular weight of from 500 to 1,000,000 and represented by the formula (1):

(1)

in which the structural unit M is a structural unit derived from a fluorine-containing ethylenic monomer and represented by the formula (M):

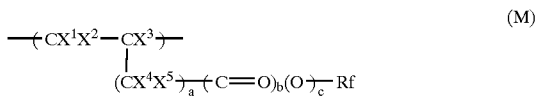

wherein $X^1$ and $X^2$ are the same or different and each is H or F; $X^3$ is H, F, $CH_3$ or $CF_3$; $X^4$ and $X^5$ are the same or different and each is H, F or $CF_3$; Rf is an organic group in which 1 to 3 of $Y^1$ ($Y^1$ is a monovalent organic group having 2 to 10 carbon atoms and an ethylenic carbon-carbon double bond at its end) are bonded to a fluorine-containing alkyl group having 1 to 40 carbon atoms or a fluorine-containing alkyl group having 2 to 100 carbon atoms and ether bond; a is 0 or an integer of from 1 to 3; b and c are the same or different and each is 0 or 1, the structural unit A is a structural unit derived from monomer copolymerizable with the fluorine-containing ethylenic monomer providing the structural unit M, and the structural unit M and the structural unit A are contained in amounts of from 0.1 to 100% by mole and from 0 to 99.9% by mole, respectively.

More preferred fluorine-containing prepolymer (I) is a fluorine-containing prepolymer having a maximum absorption coefficient of not more than 1 cm$^{-1}$ at a wavelength of from 1,290 to 1,320 and/or at a wavelength of from 1,530 to 1,570.

The second of the present invention relates to a fluorine-containing optical waveguide member obtained from a cured article of the fluorine-containing prepolymer (I) or a cured article obtained by photo-curing a composition comprising the fluorine-containing prepolymer (I) and in addition, an active energy curing initiator (II) such as a photoradical generator (II-1) or a photoacid generator (II-2), in which a maximum absorption coefficient of those cured articles is not more than 1 cm$^{-1}$ at a wavelength of from 1,290 to 1,320 and/or at a wavelength of from 1,530 to 1,570.

The third of the present invention relates to an optical waveguide device in which the fluorine-containing optical waveguide member of the second invention is used on a core portion and/or a clad portion of the device.

The present invention also relates to a method of producing an optical waveguide device which comprises the following steps (A) to (C):

(A) a step for forming a clad portion on a substrate,
(B) a step for forming, on the clad portion, a film of fluorine-containing waveguide material comprising a curable fluorine-containing prepolymer (I) which:
(1) is a non-crystalline polymer having a fluorine content of not less than 25% by weight and
(2) has a carbon-carbon double bond in the polymer side chain and/or at an end of the polymer trunk chain and an active energy curing initiator (II), and
(C) a step for forming a core portion comprising a cured article of the fluorine-containing prepolymer (I) by irradiating the film of fluorine-containing waveguide material with active energy ray.

DETAILED DESCRIPTION

Figure 1:
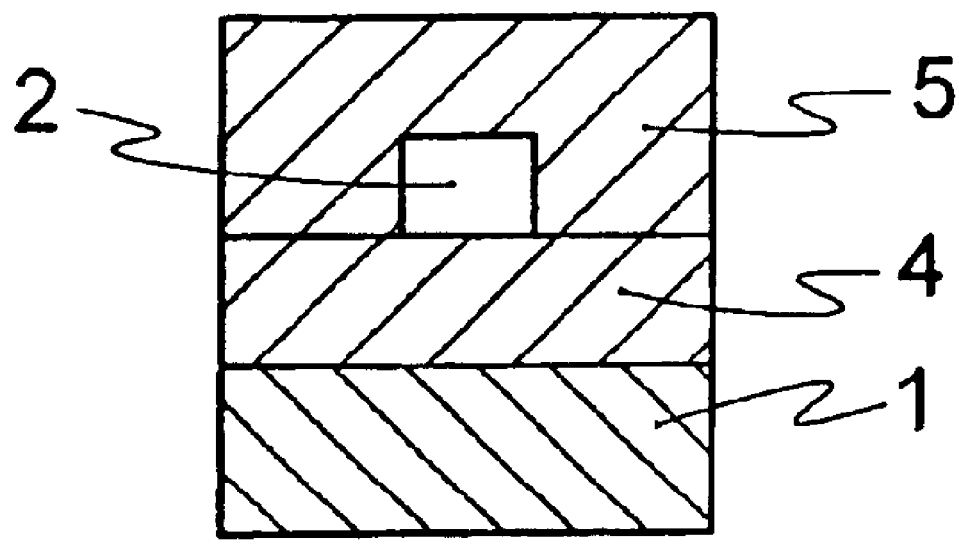
FIG. 1 is a diagrammatic cross-sectional view of the optical waveguide device of the present invention.

As mentioned supra, the fluorine-containing prepolymer (I) which is used suitably in the present invention is a fluorine-containing polymer having a number average molecular weight of from 500 to 1,000,000 and represented by the formula (1):

 (1)

in which the structural unit M is a structural unit derived from a fluorine-containing ethylenic monomer and represented by the formula (M):

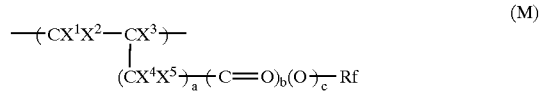

wherein $X^1$ and $X^2$ are the same or different and each is H or F; $X^3$ is H, F, $CH_3$ or $CF_3$; $X^4$ and $X^5$ are the same or different and each is H, F or $CF_3$; Rf is an organic group in which 1 to 3 of $Y^1$ ($Y^1$ is a monovalent organic group having 2 to 10 carbon atoms and an ethylenic carbon-carbon double bond at its end) are bonded to a fluorine-containing alkyl group having 1 to 40 carbon atoms or a fluorine-containing alkyl group having 2 to 100 carbon atoms and ether bond; a is 0 or an integer of from 1 to 3; b and c are the same or different and each is 0 or 1, the structural unit A is a structural unit derived from monomer copolymerizable with the fluorine-containing ethylenic monomer providing the structural unit M, and the structural unit M and the structural unit A are contained in amounts of from 0.1 to 100% by mole and from 0 to 99.9% by mole, respectively.

Namely, the prepolymer (I) is a homopolymer of the structural unit M derived from a fluorine-containing ethylenic monomer providing, in a polymer side chain, an ethylenic carbon-carbon double bond curable by a reaction or a copolymer containing the structural unit M as an essential component.

In the Rf of the structural unit M, it is preferable that at least one of $Y^1$ is bonded to an end of the Rf.

In the fluorine-containing prepolymer (I) which is used in the present invention, the structural unit M is preferably a structural unit M1 derived from a fluorine-containing ethylenic monomer and represented by the formula (M1):

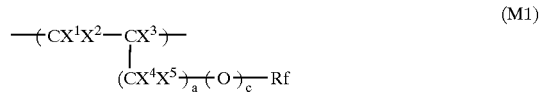

wherein $X^1$ and $X^2$ are the same or different and each is H or F; $X^3$ is H, F, $CH_3$ or $CF_3$; $X^4$ and $X^5$ are the same or different and each is H, F or $CF_3$; Rf is an organic group in which 1 to 3 of $Y^1$ ($Y^1$ is a monovalent organic group having 2 to 10 carbon atoms and an ethylenic carbon-carbon double bond at its end) are bonded to a fluorine-containing alkyl group having 1 to 40 carbon atoms or a fluorine-containing alkyl group having 2 to 100 carbon atoms and ether bond; a is 0 or an integer of from 1 to 3; c is 0 or 1.

The fluorine-containing prepolymer having the structural unit M1 is preferred since particularly near infrared transparency is high and in case of not only a homopolymer of the structural unit M1 but also a copolymer containing an increased amount of the structural unit M1, near infrared transparency can be made high.

Further example of the preferred structural unit M1 is a structural unit M2 derived from a fluorine-containing ethylenic monomer and represented by the formula (M2):

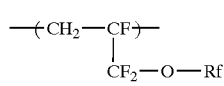 (M2)

wherein Rf is an organic group in which 1 to 3 of $Y^1$ ($Y^1$ is a monovalent organic group having 2 to 10 carbon atoms and an ethylenic carbon-carbon double bond at its end) are bonded to a fluorine-containing alkyl group having 1 to 40 carbon atoms or a fluorine-containing alkyl group having 2 to 100 carbon atoms and ether bond.

The structural unit M2 is a structural unit of a fluorine-containing allyl ether having an ethylenic carbon-carbon double bond at its end and is preferred since not only near infrared transparency can be made high but also its polymerizability is good, particularly homopolymerizability and copolymerizability with other fluorine-containing ethylenic monomer are good.

Also another example of the preferred structural unit M1 is a structural unit M3 derived from a fluorine-containing ethylenic monomer and represented by the formula (M3):

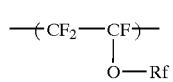 (M3)

wherein Rf is an organic group in which 1 to 3 of $Y^1$ ($Y^1$ is a monovalent organic group having 2 to 10 carbon atoms and an ethylenic carbon-carbon double bond at its end) are bonded to a fluorine-containing alkyl group having 1 to 40 carbon atoms or a fluorine-containing alkyl group having 2 to 100 carbon atoms and ether bond.

The structural unit M3 is a structural unit of a fluorine-containing vinyl ether having an ethylenic carbon-carbon double bond at its end and is preferred since near infrared transparency can be made high and also its copolymerizability with other fluorine-containing ethylenic monomer is good.

In the fluorine-containing prepolymer (I) of the formula (1) which is used in the present invention, $Y^1$ contained in the structural units M, M1, M2 and M3 is, as mentioned above, a monovalent organic group having 2 to 10 carbon atoms and an ethylenic carbon-carbon double bond at its end.

The carbon-carbon double bond in $Y^1$ has an ability of causing a polycondensation reaction, etc. and can provide a cured (crosslinked) article. Concretely, for example, a polymerization reaction and condensation reaction are caused between the molecules of the fluorine-containing prepolymer (I) or between the fluorine-containing prepolymer (I) and a curing (crosslinking) agent to be added as case demands by contact with a radical or a cation, and thereby a cured (crosslinked) article can be provided.

The first of the preferred $Y^1$ is:

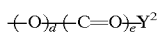

wherein $Y^2$ is an alkenyl group or fluorine-containing alkenyl group having 2 to 5 carbon atoms and an ethylenic carbon-carbon double bond at its end; d and e are the same or different and each is 0 or 1.

Example of preferred $Y^2$ is:

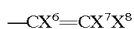

wherein $X^6$ is H, F, $CH_3$ or $CF_3$; $X^7$ and $X^8$ are the same or different and each is H or F. This group is preferred because of a high curing reactivity by contact with a radical or a cation.

Examples of the preferred $Y^2$ are:

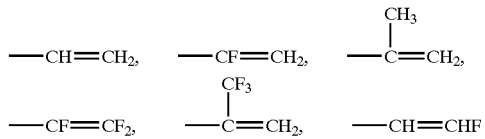

and the like.

Also more preferred $Y^1$ is:

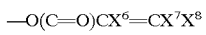

wherein $X^6$ is H, F, $CH_3$ or $CF_3$; $X^7$ and $X^8$ are the same or different and each is H or F. This group is particularly preferred because a curing reactivity by contact with a radical is high and a cured article can be obtained easily by photo-curing.

Examples of the more preferred $Y^1$ are:

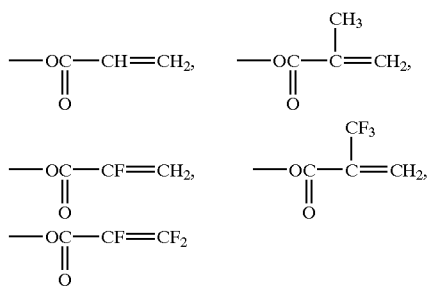

and the like.

Examples of other preferred $Y^1$ are:

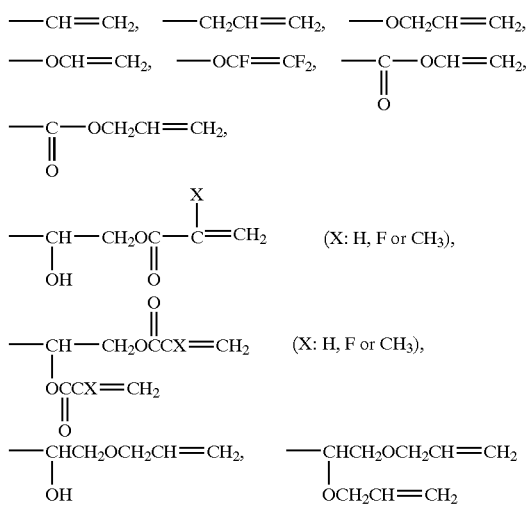

and the like.

Among the $Y^1$, those which have the structure of $-O(C=O)CF=CH_2$ is preferred because near infrared transparency can be made high, a curing (crosslinking) reactivity is particularly high and a cured article can be obtained efficiently.

The above-mentioned organic group $Y^1$ having a carbon-carbon double bond in its side chain may be introduced to an end of the polymer trunk chain.

In the fluorine-containing prepolymer (I) which is used in the present invention, —Rf— (a group obtained by excluding $Y^1$ from the —Rf) contained in the structural units M, M1, M2 and M3 is a fluorine-containing alkylene group having 1 to 40 carbon atoms or a fluorine-containing alkylene group having 2 to 100 carbon atoms and ether bond.

This —Rf— group is one in which fluorine atom is bonded to carbon atom contained therein. The —Rf— group is generally a fluorine-containing alkylene group or fluorine-containing alkylene group having ether bond in which fluorine atom and hydrogen atom or chlorine atom are bonded to carbon atom. Preferred —Rf— group is one having more fluorine atoms (a high fluorine content). More preferred is a perfluoroalkylene group or a perfluoroalkylene group having ether bond. The fluorine content of the fluorine-containing prepolymer (I) is not less than 25% by weight, preferably not less than 40% by weight. Such a fluorine content is preferred because near infrared transparency of the fluorine-containing prepolymer (I) can be made high and also a high near infrared transparency can be maintained even if a curing degree (crosslinking density) is increased particularly to increase heat resistance and elasticity of a cured article.

Too large number of carbon atoms of —Rf— is not preferred because there is a case where solubility in a solvent is lowered and transparency is lowered in case of a fluorine-containing alkylene group, and because hardness and mechanical properties of the polymer itself and the cured article are lowered in case of a fluorine-containing alkylene group having ether bond. The number of carbon atoms of the fluorine-containing alkylene group is preferably from 1 to 20, more preferably from 1 to 10. The number of carbon atoms of the fluorine-containing alkylene group having ether bond is preferably from 2 to 30, more preferably from 2 to 20.

Examples of preferred —Rf— are:

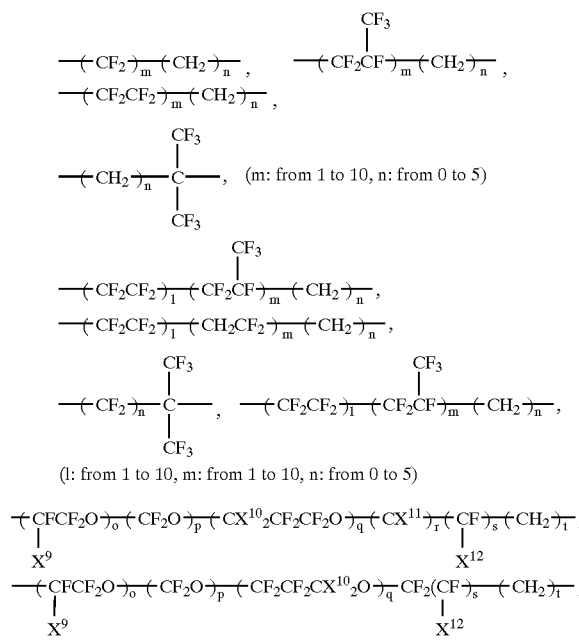

($X^9$ and $X^{12}$ are F or $CF_3$; $X^{10}$ and $X^{11}$ are H or F; o+p+q is from 1 to 30; r is 0 or 1; s and t are 0 or 1) and the like.

As mentioned above, the structural unit M constituting the fluorine-containing prepolymer (I) of the present invention is preferably the structural unit M1 and the structural unit M1 is preferably the structural units M2 and M3. Next, mentioned below are preferred examples of the structural units M2 and M3.

Examples of the preferred monomers constituting the structural unit M2 are:

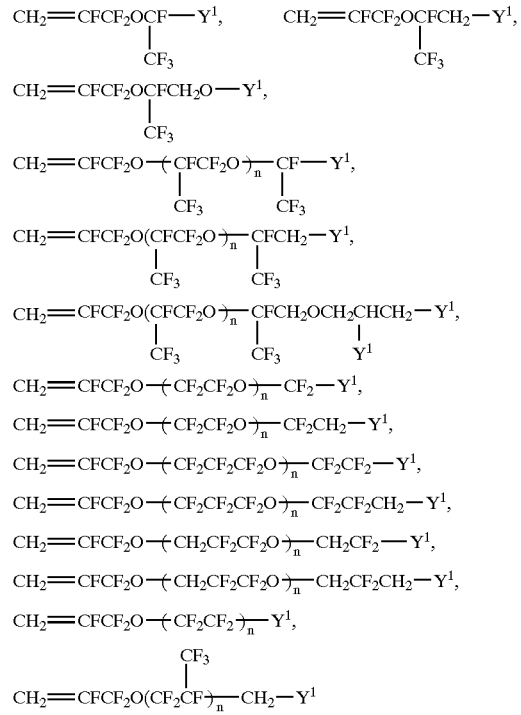

(n: an integer of from 1 to 30, $Y^1$ is as defined above) and the like.

More concretely there are:

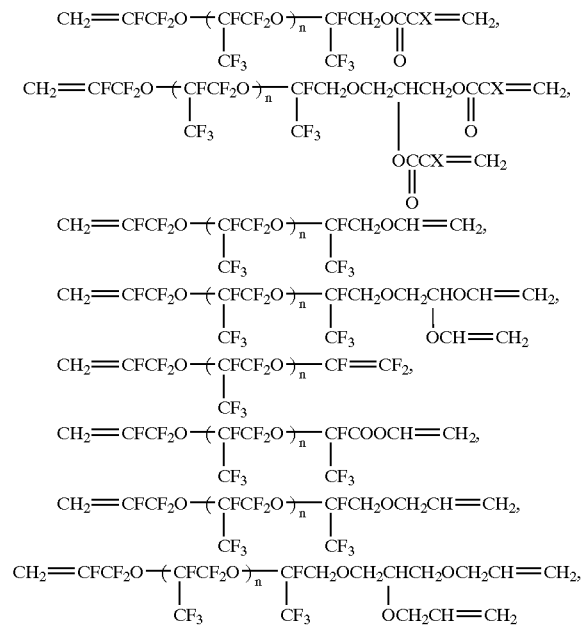

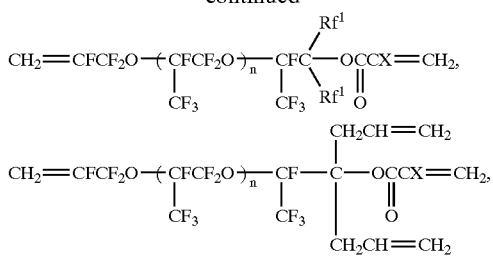

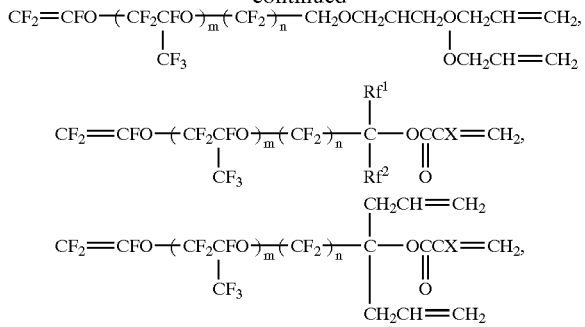

(Rf¹ and Rf² are perfluoroalkyl groups having 1 to 5 carbon atoms; n is an integer of from 0 to 30; X is H, $CH_3$, F or $CF_3$)
and the like.

Examples of the preferred monomer constituting the structural unit M3 are:

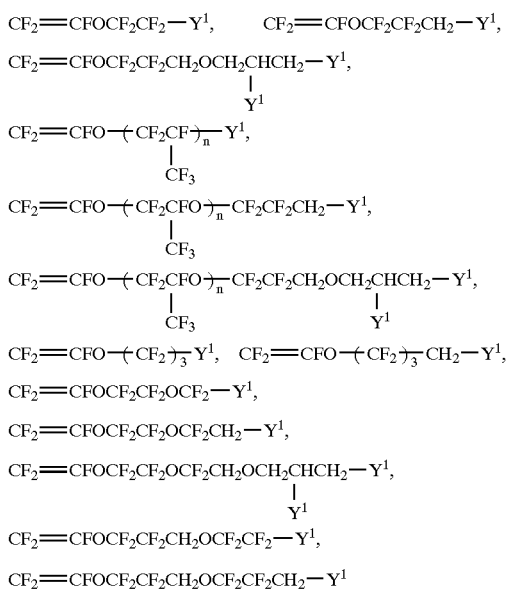

($Y^1$ is as defined above; n is an integer of from 1 to 30)

and the like.

More concretely there are:

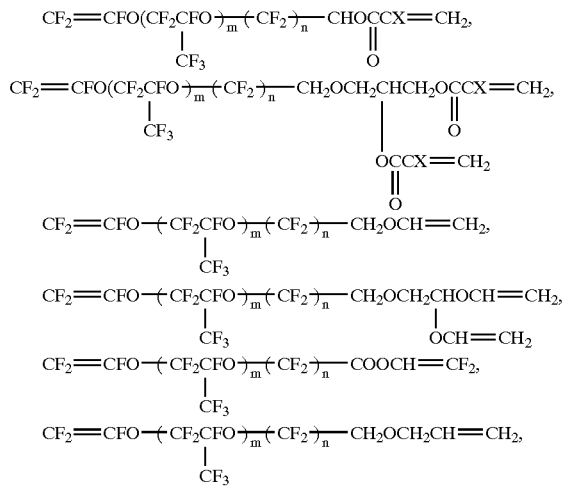

(Rf¹ and Rf² are perfluoroalkyl groups having 1 to 5 carbon atoms; m is an integer of from 0 to 30; n is an integer of from 1 to 3; X is H, $CH_3$, F or $CF_3$)
and the like.

Examples of the monomer constituting the structural unit M of the fluorine-containing prepolymer (I) other than the above-mentioned structural units M2 and M3 are, for instance,

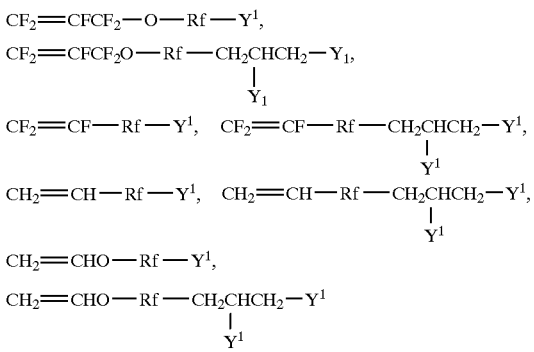

and the like wherein $Y^1$ and —Rf— are as defined above.

More concretely there are:

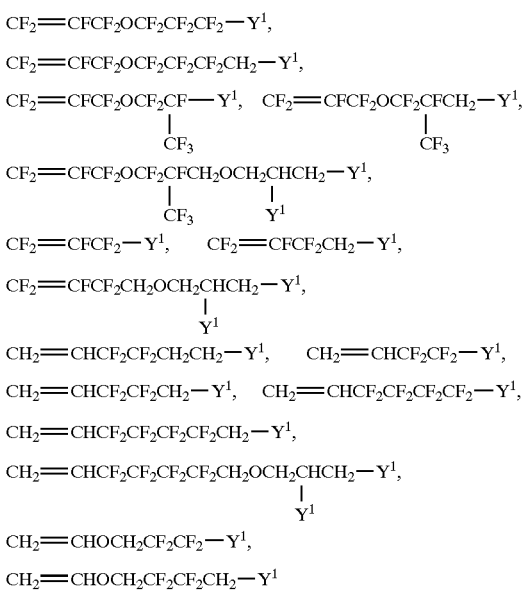

and the like, wherein $Y^1$ is as defined above.

In the fluorine-containing prepolymer (I) of the present invention, the structural unit A is an optional component.

The structural unit A is not limited particularly as far as it is a monomer copolymerizable with the structural units M, M1, M2 and M3. The structural unit A may be optionally selected depending on intended applications and required characteristics of the fluorine-containing prepolymer and a cured article obtained therefrom.

Examples of the structural unit A are, for instance, as follows.

(i) Structural Units Derived from Fluorine-Containing Ethylenic Monomers having Functional Group These structural units (i) are preferred from the point that adhesion to a substrate and solubility in a solvent, particularly in a general-purpose solvent can be imparted to the fluorine-containing prepolymer (I) and a cured article obtained therefrom while maintaining a high near infrared transparency, and is also preferred from the point that functions such as crosslinkability other than those affected by $Y^1$ can be imparted.

Preferred structural unit (i) of the fluorine-containing ethylenic monomer having functional group is a structural unit represented by the formula (3):

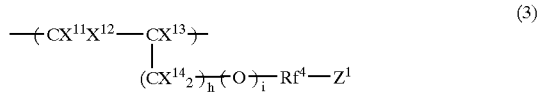

wherein $X^{11}$, $X^{12}$ and $X^{13}$ are the same or different and each is H or F; $X^{14}$ is H, F or $CF_3$; h is 0, 1 or 2; i is 0 or 1; $Rf^4$ is a fluorine-containing alkylene group having 1 to 40 carbon atoms or a fluorine-containing alkylene group having 2 to 100 carbon atoms and ether bond; $Z^1$ is a functional group selected from the group consisting of —OH, —$CH_2OH$, —COOH, carboxylic acid derivative, —$SO_3H$, sulfonic acid derivative, epoxy and cyano, and particularly preferred is a structural unit derived from:

wherein $Rf^4$ and $Z^1$ are as defined above.

More concretely there are preferably structural units derived from fluorine-containing ethylenic monomers such as:

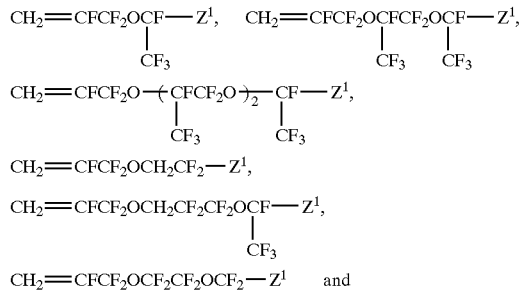

wherein $Z^1$ is as defined above.

Also there are preferred structural units derived from monomers represented by:

wherein $Rf^4$ and $Z^1$ are as defined above. More concretely there are structural units derived from monomers such as:

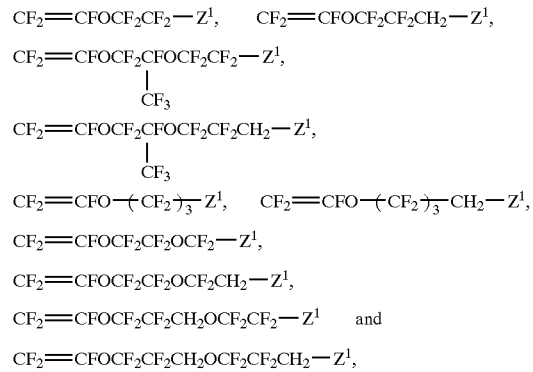

wherein $Z^1$ is as defined above.

Examples of the other fluorine-containing ethylenic monomer having functional group are:

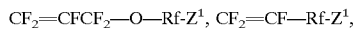

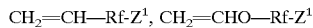

and the like, wherein —Rf— is the same as the above-mentioned —Rf— and $Z^1$ is as defined above. More concretely there are

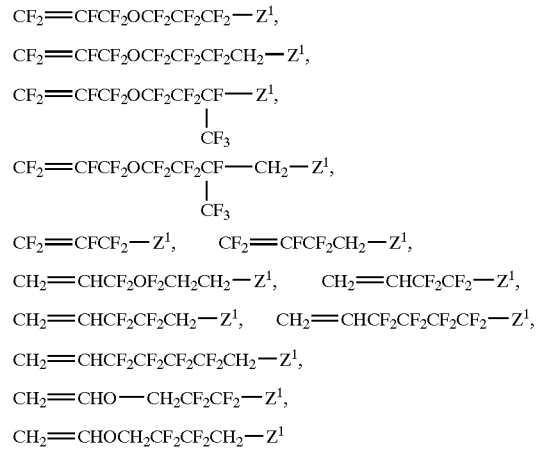

and the like, wherein $Z^1$ is as defined above.

When using the monomer having —OH group, —COOH group or —$SO_3H$ group, it is preferable that an amount thereof is in a range where near infrared transparency is not lowered.

(ii) Structural Units Derived from Fluorine-Containing Ethylenic Monomers not having Functional Group These structural units (ii) are preferred from the point that a higher near infrared transparency of the fluorine-containing prepolymer (I) and a cured article obtained therefrom can be maintained. Further these structural units are preferred from the point that by selecting the monomer, mechanical properties and glass transition temperature of the polymer can be adjusted, particularly the glass transition temperature can be increased by copolymerization with the structural unit M.

Examples of the preferred structural units (ii) of the fluorine-containing ethylenic monomer are those represented by the formula (4):

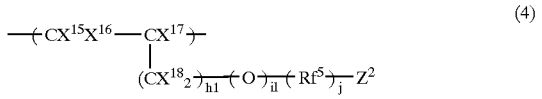

(4)

wherein $X^{15}$, $X^{16}$ and $X^{18}$ are the same or different and each is H or F; $X^{17}$ is H, F or $CF_3$; h1, i1 and j are 0 or 1; $Z^2$ is H, F or Cl; $Rf^5$ is a fluorine-containing alkylene group having 1 to 20 carbon atoms or a fluorine-containing alkylene group having 2 to 100 carbon atoms and ether bond.

Examples thereof are preferably structural units derived from monomers such as:

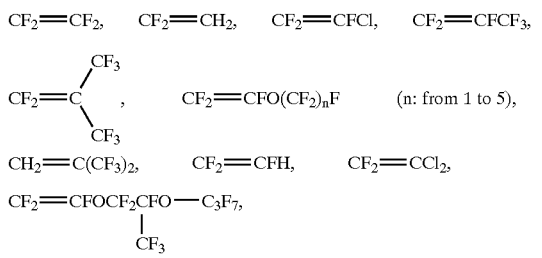

$CH_2=CF \text{-} (CF_2)_n \text{-} Z^2$ ($Z^2$ is as defined in the formula (4), n is from 1 to 10) and
$CH_2=CHOCH_2 \text{-} (CF_2)_n \text{-} Z^2$ ($Z^2$ is as defined in the formula (4), n is from 1 to 10)

(iii) Fluorine-Containing Aliphatic Ring Structural Units

Introduction of these structural units (iii) is preferred since transparency can be increased, a near infrared transparency can be increased more and further since the fluorine-containing prepolymer (I) having a high glass transition temperature can be obtained and a higher hardness of the cured article can be expected.

Examples of the preferred fluorine-containing aliphatic ring structural unit (iii) are those represented by the formula (5):

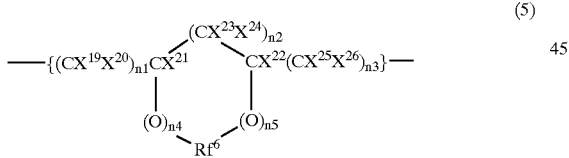

(5)

wherein $X^{19}$, $X^{20}$, $X^{23}$, $X^{24}$, $X^{25}$ and $X^{26}$ are the same or different and each is H or F; $X^{21}$ and $X^{22}$ are the same or different and each is H, F, Cl or $CF_3$; $Rf^6$ is a fluorine-containing alkylene group having 1 to 10 carbon atoms or a fluorine-containing alkylene group having 2 to 10 carbon atoms and ether bond; n2 is 0 or an integer of from 1 to 3; n1, n3, n4 and n5 are the same or different and each is 0 or 1.

For example, there are structural units represented by:

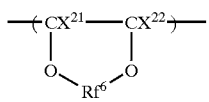

wherein $Rf^6$, $X^{21}$ and $X^{22}$ are as defined above.

Concretely there are:

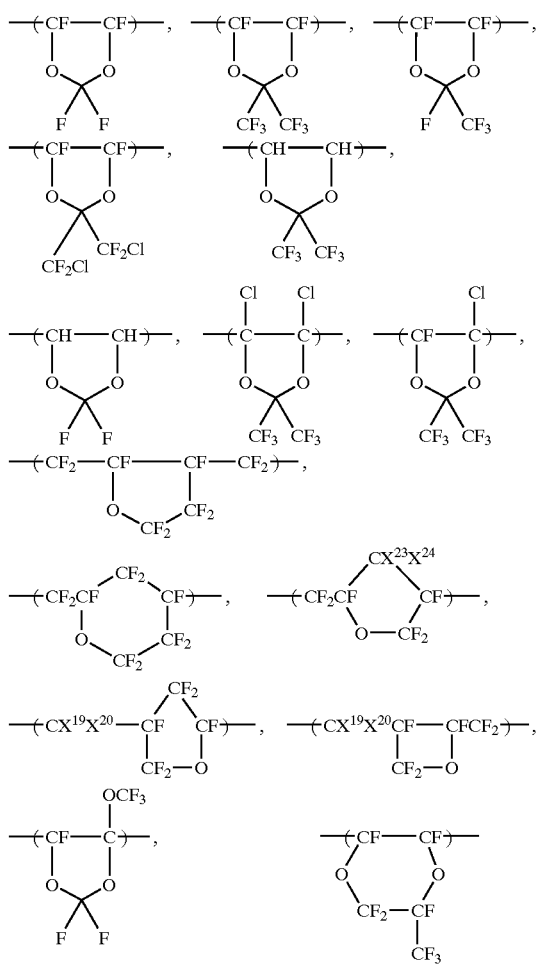

and the like wherein $X^{19}$, $X^{20}$, $X^{23}$ and $X^{24}$ are as defined above.

Examples of the other fluorine-containing aliphatic ring structural unit are, for instance,

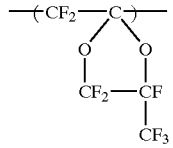

and the like.

(iv) Structural Units Derived from Ethylenic Monomers not having Fluorine

The structural units (iv) derived from ethylenic monomers not having fluorine may be introduced to the polymer in a range where the introduction does not have an adverse effect on near infrared transparency.

The introduction of those structural units (iv) is preferred since solubility in a general-purpose solvent is enhanced and compatibility with additives, for example, a photocatalyst and a curing agent to be added as case demands can be improved.

Examples of the non-fluorine-containing ethylenic monomer are as follows.

α-Olefins:
Ethylene, propylene, butene, vinyl chloride, vinylidene chloride and the like.

Vinyl ether or vinyl ester monomers:
   $CH_2=CHOR$, $CH_2=CHOCOR$(R: hydrocarbon group having 1 to 20 carbon atoms) and the like.
Allyl monomers:
   $CH_2=CHCH_2Cl$, $CH_2=CHCH_2OH$, $CH_2=CHCH_2COOH$, $CH_2=CHCH_2Br$ and the like.
Allyl ether monomers:

(R: hydrocarbon group having 1 to 20 carbon atoms),

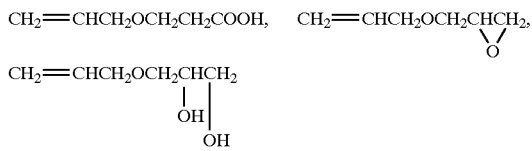

and the like.
Acrylic or methacrylic monomers:
   Acrylic acid, methacrylic acid, acrylic acid esters, methacrylic acid esters, maleic anhydride, maleic acid, maleic acid esters and the like. Monomers obtained by replacing hydrogen atoms of the above-mentioned non-fluorine-containing monomers with heavy hydrogen atoms are more preferred from the viewpoint of transparency.

(v) Structural Units Derived from Alicyclic Monomers

A structural unit (v) of an alicyclic monomer may be introduced as a component copolymerizable with the structural unit M, more preferably as the third component in addition to the structural unit M and the structural unit of the above-mentioned fluorine-containing ethylenic monomer or non-fluorine-containing ethylenic monomer (the above-mentioned (iii) or (iv)), thereby making a glass transition temperature and hardness high.

Examples of the alicyclic monomer (v) are norbornene derivatives represented by:

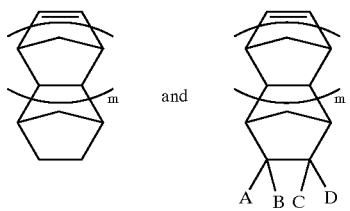

wherein m is 0 or an integer of from 1 to 3; A, B, C and D are the same or different and each is H, F, Cl, COOH, $CH_2OH$, a perfluoroalkyl group having 1 to 5 carbon atoms or the like, alicyclic monomers such as:

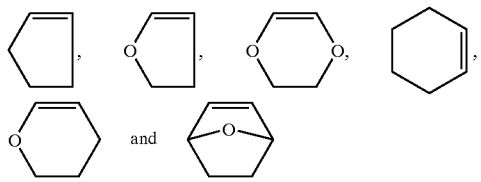

and derivatives thereof in which a substituent is introduced.

In the fluorine-containing prepolymer (I) of the present invention, various combinations and proportions of the structural units M (M1, M2 or M3) and A can be selected from the above-mentioned examples depending on intended applications, physical properties (particularly glass transition temperature, hardness, etc.), functions (transparency and near infrared transparency) and the like as far as the combination of the structural units M and A makes the polymer non-crystalline and the fluorine content becomes not less than 25% by weight.

The fluorine-containing prepolymer (I) contains the structural unit M (M1, M2 or M3) as an essential component and is characterized in that the structural unit M itself has functions of maintaining a high near infrared transparency and imparting transparency and functions of being capable of imparting hardness, heat resistance, abrasion resistance, scratch resistance and solvent resistance to a cured article by curing. Also the fluorine-containing prepolymer has a characteristic that a refractive index can be controlled by selecting the content of the structural unit M. Therefore even if the fluorine-containing prepolymer (I) contains a larger amount of the structural unit M or in the extreme case, even if the prepolymer consists of the structural unit M (100% by mole), a high near infrared transparency can be maintained. Further a cured article having a high curing (crosslinking) density can be obtained and a coating film having a high hardness and excellent abrasion resistance, scratch resistance and heat resistance can be obtained.

Also in the case of the copolymer of the fluorine-containing prepolymer (I) comprising the structural unit M and the structural unit A, when the structural unit A is selected from the above-mentioned examples, there can be obtained the prepolymer providing a cured article having a higher hardness, a high glass transition temperature and a high near infrared transparency.

In the copolymer of the fluorine-containing prepolymer (I) comprising the structural unit M and the structural unit A, the proportion of the structural unit M may be not less than 0.1% by mole based on the whole structural units constituting the fluorine-containing prepolymer (I). The proportion is not less than 2.0% by mole, preferably not less than 5% by mole, more preferably not less than 10% by mole in order to obtain the cured article having a high hardness, excellent abrasion resistance and scratch resistance and good chemical resistance and solvent resistance by curing (crosslinking).

Particularly for the optical waveguide material applications which require formation of a cured coating film having excellent heat resistance and transparency and small moisture absorption, it is preferable that the structural unit M is contained in an amount of not less than 10% by mole, preferably not less than 20% by mole, more preferably not less than 50% by mole. An upper limit thereof is lower than 100% by mole.

The curable fluorine-containing prepolymer (I) of the present invention has preferable characteristics particularly for the optical waveguide material applications since near infrared transparency is not lowered even if the proportion of the structural unit M is increased (or even if the number of cure sites is increased).

In case where a high transparency is required in a region of from visible light to near infrared ray in optical communication applications, it is important that the curable fluorine-containing prepolymer (I) has a combination and proportion of the structural units M and A which make the prepolymer non-crystalline. Being non-crystalline means that in DSC analysis, when measurement is carried out at a heating rate of 10° C./min (ASTM D3418-99), an absorption peak derived from melting is not substantially observed or heat of melting is 1 J/g or lower at the 2nd run.

It is preferable that the fluorine content of the curable fluorine-containing prepolymer (I) is not less than 25% by weight.

If the fluorine content is low, transparency in a near infrared region is lowered. Also if the fluorine content is low, moisture absorption is increased and therefore the prepolymer cannot be used substantially as an optical material for optical communication, etc. For the light amplification material and light emission material applications, most preferable fluorine content is not less than 40% by weight. An upper limit of the fluorine content varies depending on the composition of the fluorine-containing prepolymer (I) and is about 75% by weight which is a fluorine content when all hydrogen atoms are replaced with fluorine atoms.

As a method of measuring a fluorine content, generally there is used a method of calculating the fluorine content by analyzing components of a polymer from measurements with $^{19}$F-NMR and $^1$H-NMR. When it is difficult to analyze a polymer structure by the above methods, there is used a method of elementary analysis of fluorine in which 2 mg of a sample and a combustion improver (10 mg of sodium peroxide) are wrapped with a filter paper (filter paper No.7 available from Toyo Roshi), are put in a platinum basket and then are burned in a 500 ml flask filled with 25 ml of pure water. Immediately after the burning, the flask is shaken to absorb fluorine ion in pure water and then fluorine ion absorbed in pure water is analyzed with a fluorine ion electrode (fluorine ion meter model 901 available from Orion Research).

The molecular weight of the fluorine-containing prepolymer (I) can be selected, for example, in a range of from 500 to 1,000,000 in number average molecular weight, and is preferably from 1,000 to 500,000, particularly preferably from 2,000 to 200,000.

If the molecular weight is too low, mechanical properties are apt to be insufficient even after the curing, and particularly a cured article and a cured coating film are apt to be fragile and insufficient in strength. If the molecular weight is too high, solubility in a solvent is lowered, particularly film forming property and leveling property are apt to be lowered at forming a thin film and storage stability of the fluorine-containing prepolymer is apt to be unstable. For optical waveguide applications, most preferable molecular weight is selected in a range of from 5,000 to 100,000 in number average molecular weight.

It is preferable that the fluorine-containing prepolymer (I) itself (before curing) has a maximum absorption coefficient of not more than 1 cm$^{-1}$, more preferably not more than 0.5 cm$^{-1}$, particularly preferably not more than 0.1 cm$^{-1}$ in the wavelength ranges of from 1,290 to 1,320 nm and 1,530 to 1,570 nm and further has a refractive index in nd of from 1.3 to 1.7. Adjustments thereof can be made by determining various kinds and contents of the structural unit M and kinds of the structural unit A to be used as case demands and make it possible to selectively use the prepolymer on a core portion or a clad portion of an optical waveguide device explained infra.

Further it is preferable that the fluorine-containing prepolymer is soluble in general-purpose solvents, for example, in at least one of ketone solvents, acetic acid ester solvents, alcohol solvents and aromatic solvents or in solvent mixtures containing at least one of the above-mentioned general-purpose solvents.

When the prepolymer is soluble in general-purpose solvents, it is preferable because film forming property and homogeneity are excellent particularly in case of forming a thin coating film of about 3 μm in a process for forming an optical waveguide. The prepolymer is also advantageous from the viewpoint of productivity in forming an optical waveguide.

Being soluble in a solvent according to the present invention means that the fluorine-containing prepolymer is soluble in a solvent in an amount of 10 mg/g, preferably 20 mg/g, more preferably 50 mg/g.

In order to obtain the fluorine-containing prepolymer (I) of the present invention, generally any of
(i) a method of previously synthesizing a monomer having $Y^1$ and then polymerizing the monomer,
(ii) a method of once synthesizing a polymer having another functional group and then converting the functional group by high molecular reaction, thus introducing the functional group $Y^1$ into the polymer,
or the like method can be employed.

In the method (i), in order to obtain the fluorine-containing prepolymer (I) having a carbon-carbon double bond in its side chain without reacting (curing) the carbon-carbon double bond at an end of its side chain, it is necessary to change reactivity of two kinds of double bonds (a double bond becoming a trunk chain and a double bond becoming a side chain) in a (co)polymerizable monomer and thereby make only one of the double bonds participate in the polymerization. In such a method, it is difficult to select the polymerization conditions for obtaining the fluorine-containing prepolymer having a double bond in its side chain, and also it is difficult to obtain a high curing reactivity of the double bond in the side chain of the obtained fluorine-containing prepolymer. Therefore the method (ii) is preferred.

The method (ii) is a preferable method since it is easy to obtain the fluorine-containing prepolymer of the present invention without curing reaction and also since a carbon-carbon double bond having a high curing reactivity can be introduced to its side chain and/or an end of its trunk chain.

Among the methods (ii), as mentioned infra, there is preferably employed, for example, a method of synthesizing a fluorine-containing polymer comprising the structural unit N of a fluorine-containing monomer having hydroxyl or an organic group $Y^3$ having hydroxyl and as case demands, the structural unit B of a monomer copolymerizable with N, and then reacting the polymer with an unsaturated carboxylic acid or its derivative to introduce a carbon-carbon double bond to a side chain and/or an end of a trunk chain of the polymer.

The details of the method are explained below.

The fluorine-containing prepolymer (I) is prepared by esterification of a fluorine-containing polymer (III) having hydroxyl with an unsaturated carboxylic acid or its derivative in which the fluorine-containing polymer is a polymer represented by the formula (2):

     (2)

in which the structural unit N is a structural unit having hydroxyl which is derived from a fluorine-containing ethylenic monomer and represented by the formula (N):

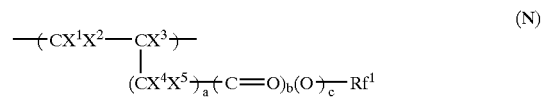

wherein $X^1$ and $X^2$ are the same or different and each is H or F; $X^3$ is H, F, $CH_3$ or $CF_3$; $X^4$ and $X^5$ are the same or different and each is H, F or $CF_3$; $Rf^1$ is an organic group in which 1 to 3 of $Y^3$ ($Y^3$ is hydroxyl or a monovalent organic group having hydroxyl and 1 to 10 carbon atoms) are bonded to a fluorine-containing alkyl group having 1 to 40 carbon atoms or a fluorine-containing alkyl group having 2 to 100 carbon atoms and ether bond; a is 0 or an integer of from 1 to 3; b and c are the same or different and each is 0 or 1, the structural unit B is a structural unit derived from monomer copolymerizable with the fluorine-containing ethylenic monomer having hydroxyl which provides the structural unit N,
and the structural unit N and the structural unit B are contained in amounts of from 0.1 to 100% by mole and from 0 to 99.9% by mole, respectively.

In the above-mentioned process for preparing the fluorine-containing prepolymer (I), examples of the preferable structural unit N of the fluorine-containing polymer (III) having hydroxyl which is a precursor represented by the formula (2) are structures which correspond to the above-exemplified respective structural units M of the fluorine-containing prepolymer (I) and have the $Y^3$ having OH group instead of the $Y^1$ having a carbon-carbon double bond. Those structural units can be used preferably. As the structural unit B, there can be preferably used the same structural units as the above-mentioned structural unit A.

The unsaturated carboxylic acid or its derivative which is reacted with the fluorine-containing polymer (III) having hydroxyl may be any of carboxylic acids or derivatives thereof having a carbon-carbon double bond at an end thereof. Particularly preferred are α,β-unsaturated carboxylic acids or derivatives thereof.

Examples thereof are, for instance, carboxylic acids represented by:

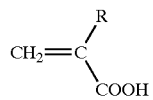

wherein R is H, $CH_3$, F, $CF_3$ or Cl, or anhydrides thereof, acid halides represented by:

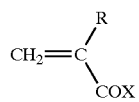

wherein R is as defined above, X is Cl or F, and in addition, maleic acid, maleic anhydride, maleic acid monoalkylester and the like.

Among them, unsaturated carboxylic acid halides are preferred since the reaction can be carried out at room temperature and gelling of a prepared polymer can be prevented.

Particularly preferred are:

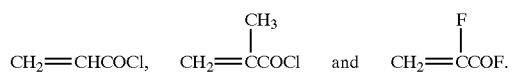

The method of reacting α,β-unsaturated carboxylic acid halide with the fluorine-containing polymer (III) having hydroxyl is not limited particularly and may be usually carried out by dissolving the fluorine-containing polymer (III) having hydroxyl in a solvent and mixing the α,β-unsaturated carboxylic acid halide thereto at a temperature of from about −20° C. to about 40° C. with stirring for reaction.

In the reaction, HCl and HF are produced through the reaction, and for capturing them, it is desirable to add a proper base. Examples of the base are tertiary amines such as pyridine, N,N-dimethylaniline, tetramethylurea and triethylamine, magnesium metal and the like. Also an inhibitor may be present to prevent a polymerization reaction of the starting α,β-unsaturated carboxylic acid and the carbon-carbon double bond in the obtained curable fluorine-containing prepolymer during the reaction.

Examples of the inhibitor are hydroquinone, t-butyl hydroquinone, hydroquinone monomethylether and the like.

The fluorine-containing polymer (III) having hydroxyl before the reaction with the unsaturated carboxylic acid or its derivative can be obtained by (co)polymerizing, through known method, the ethylenic monomer N having hydroxyl and the monomer B to be used as a copolymerizable component, which correspond to the respective structural units. For the polymerization, radical polymerization method, anion polymerization method, cation polymerization method and the like can be employed. Among them, the radical polymerization method is preferably used from the viewpoint that each monomer exemplified to obtain the fluorine-containing polymer (III) having hydroxyl has good radical polymerizability, control of composition and molecular weight of the obtained polymer is easy and production in an industrial scale is easy.

In order to initiate the radical polymerization, means for initiation is not limited particularly as far as the polymerization proceeds radically. The polymerization is initiated, for example, with an organic or inorganic radical polymerization initiator, heat, light, ionizing radiation or the like. The polymerization can be carried out by solution polymerization, bulk polymerization, suspension polymerization, emulsion polymerization or the like. The molecular weight is controlled by the contents of the monomers to be used for the polymerization, the content of the polymerization initiator, the content of a chain transfer agent, temperature, etc. The components of the copolymer can be controlled by the starting monomer components.

The optical waveguide material of the present invention can be obtained by using the fluorine-containing prepolymer (I) solely and may be in the form of a photo-curable composition by further adding an active energy curing initiator (II) such as a photoradical generator (II-1) or a photoacid generator (II-2).

The fluorine-containing prepolymer (I) for the material of the present invention is the above-mentioned non-crystalline fluorine-containing prepolymer having a carbon-carbon double bond in its side chain and/or at an end of its trunk chain and having a fluorine content of not less than 25% by weight. Preferable examples thereof are the same as those mentioned supra.

The active energy curing initiator (II) generates a radical or a cation (acid) only by irradiation of an active energy ray, for example, an electromagnetic wave having a wavelength of not more than 350 nm such as ultraviolet light, electron beam, X-ray or γ-ray and functions as a catalyst for initiating curing (crosslinking reaction) of a carbon-carbon double bond of the fluorine-containing prepolymer. Usually an initiator which generates a radical or a cation (acid) by irradiation of ultraviolet light is used and particularly one which generates a radical is used.

According to the photo-curable fluorine-containing resin composition which is the optical waveguide material of the present invention, the curing reaction can be initiated easily with the above-mentioned active energy rays, heating at high temperature is not necessary and the curing reaction can be carried out at relatively low temperature. Therefore the fluorine-containing resin composition is preferred since it can be applied on a substrate, for example, a transparent resin substrate which has a low heat resistance and is apt to be deformed, decomposed or colored due to heat.

In the material of the present invention, the active energy curing initiator (II) is optionally selected depending on kind (radical-reactive or cation(acid)-reactive) of the carbon-carbon double bond in the fluorine-containing prepolymer (I), kind (wavelength range, etc.) of the active energy ray, intensity of irradiation, etc.

Generally examples of the initiator (photoradical generator) which functions to cure the fluorine-containing polymer (I) having a radical-reactive carbon-carbon double bond with active energy ray in an ultraviolet region are, for instance, those mentioned below.

Acetophenone Initiators

Acetophenone, chloroacetophenone, diethoxyacetophenone, hydroxyacetophenone, α-aminoacetophenone and the like.

Benzoin Initiators

Benzoin, benzoinmethylether, benzoinethylether, benzoinisopropylether, benzoinisobutylether, benzyldimethylketal and the like.

Benzophenone Initiators

Benzophenone, benzoyl benzoate, methyl-o-benzoylbenzoate, 4-phenylbenzophenone, hydroxybenzophenone, hydroxypropylbenzophenone, acrylated benzophenone, Michler's ketone and the like.

Thioxanthone Initiators

Thioxanthone, chlorothioxanthone, methylthioxanthone, diethylthioxanthone, dimethylthioxanthone and the like.

Other Initiators

Benzyl, α-acyloxime ester, acylphosphine oxide, glyoxyester, 3-ketocoumaran, 2-ethylanthraquinone, camphorquinone, anthraquinone and the like.

Also as case demands, an auxiliary for photo-initiation such as amines, sulfones or sulfines may be added.

Also examples of the initiator (photoacid generator) which cures the fluorine-containing prepolymer (I) having a cation(or acid)-reactive carbon-carbon double bond are those mentioned below.

Onium Salts

Iodonium salt, sulfonium salt, phosphonium salt, diazonium salt, ammonium salt, pyridinium salt and the like.

Sulfone Compounds

β-ketoester, β-sulfonylsulfone, α-diazo compounds thereof and the like.

Sulfonic Acid Esters

Alkylsulfonic acid ester, haloalkylsulfonic acid ester, arylsulfonic acid ester, iminosulfonate and the like.

Others

Sulfonimide compounds, diazomethane compounds and the like.

Examples of the radical-reactive carbon-carbon double bond are, for instance, those represented by the above-mentioned formula:

$$-O(C=O)CX^6=CX^7X^8$$

and examples of the cation-reactive carbon-carbon double bond are, for instance, those represented by the above-mentioned formulae:

and the like among those exemplified supra as the preferable $Y^1$.

In the optical waveguide material of the present invention, the curable fluorine-containing resin composition comprises the fluorine-containing prepolymer (I) and the active energy curing initiator. Further a solvent mentioned infra may be added to form a coating solution of the fluorine-containing resin composition and if necessary, a curing agent may be added to the coating solution.

Preferred curing agents are those which have at least one carbon-carbon unsaturated bond and can be polymerized with a radical or an acid. Examples thereof are radically polymerizable monomers such as acrylic monomers and cationically polymerizable monomers such as vinyl ether monomers. Those monomers may be monofunctional monomers having one carbon-carbon double bond or polyfunctional monomers having two or more carbon-carbon double bonds.

Those so-called curing agents having a carbon-carbon unsaturated bond react by a radical or cation generated by a reaction of the active energy curing initiator in the material of the present invention with an active energy ray such as light and can be crosslinked with the carbon-carbon double bond of the fluorine-containing prepolymer (I) in the material of the present invention by copolymerization.

Examples of the monofunctional acrylic monomer are acrylic acid, acrylic acid esters, methacrylic acid, methacrylic acid esters, α-fluoroacrylic acid, α-fluoroacrylic acid esters, maleic acid, maleic anhydride, maleic acid esters and (meth)acrylic acid esters having epoxy, hydroxyl, carboxyl or the like.

Among them, particularly preferred are acrylate monomers having fluoroalkyl group in order to maintain a high near infrared transparency of a cured article. For example, preferred are compounds represented by the formula:

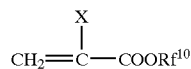

wherein X is H, $CH_3$ or F; $Rf^{10}$ is a fluorine-containing alkyl group having 2 to 40 carbon atoms or a fluorine-containing alkyl group having 2 to 100 carbon atoms and ether bond.

Examples thereof are:

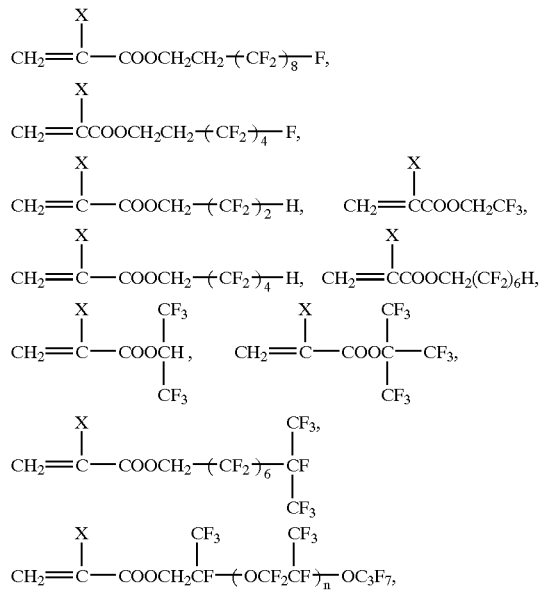

(X: H, $CH_3$ or F; n: an integer of from 1 to 5)

and the like.

As the polyfunctional acrylic monomer, there are generally known compounds obtained by replacing hydroxyl groups of polyhydric alcohols such as diol, triol and tetraol with acrylate groups, methacrylate groups or α-fluoroacrylate groups.

Examples thereof are compounds obtained by replacing two or more hydroxyl groups of polyhydric alcohols such as 1,3-butanediol, 1,4-butanediol, 1,6-hexanediol, diethylene glycol, tripropylene glycol, neopentyl glycol, trimethylol propane, pentaerythritol and dipentaerythritol with any of acrylate groups, methacrylate groups or α-fluoroacrylate groups.

Also there can be used polyfunctional acrylic monomers obtained by replacing two or more hydroxyl groups of polyhydric alcohols having a fluorine-containing alkyl group or a fluorine-containing alkylene group with acrylate groups, methacrylate groups or α-fluoroacrylate groups. Those monomers are preferred particularly from the point that a high near infrared transparency of a cured article can be maintained.

Preferable examples thereof are compounds having a structure obtained by replacing two or more hydroxyl groups of fluorine-containing polyhydric alcohols represented by the formulae:

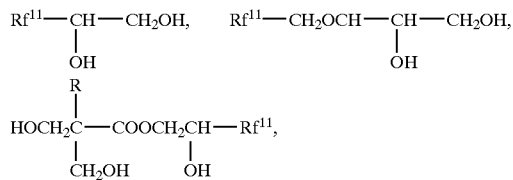

($Rf^{11}$ is a fluorine-containing alkyl group having 1 to 40 carbon atoms; R is H or an alkyl group having 1 to 3 carbon atoms)

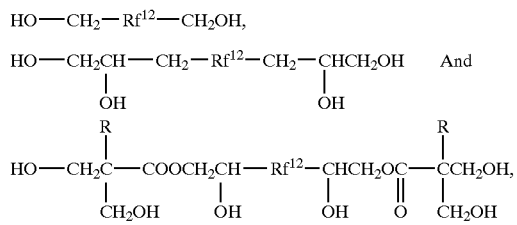

($Rf^{12}$ is a fluorine-containing alkylene group having 1 to 40 carbon atoms; R is H or an alkyl group having 1 to 3 carbon atoms),
with acrylate groups, methacrylate groups or α-fluoroacrylate groups.

When those exemplified monofunctional and polyfunctional acrylic monomers are used as the curing agent for the material of the present invention, particularly preferred are α-fluoroacrylate compounds from the viewpoint of good curing reactivity.

In the optical waveguide material of the present invention, an adding amount of the active energy curing initiator (II) is optionally selected depending on the content of the carbon-carbon double bonds in the fluorine-containing prepolymer (I), an amount of the curing agent and further kinds of the initiator and active energy ray and an amount of irradiation energy (intensity and time) and also depending on whether or not the above-mentioned curing agent is used. When the curing agent is not used, the amount of the initiator is from 0.01 to 30 parts by weight, preferably from 0.05 to 20 parts by weight, most preferably from 0.1 to 10 parts by weight based on 100 parts by weight of the fluorine-containing prepolymer (I).

Concretely the amount of the initiator is from 0.05 to 50% by mole, preferably from 0.1 to 20% by mole, most preferably from 0.5 to 10% by mole based on the content (the number of moles) of the carbon-carbon double bonds contained in the fluorine-containing prepolymer (I).

When the curing agent is used, the amount of the initiator is from 0.05 to 50% by mole, preferably from 0.1 to 20% by mole, most preferably from 0.5 to 10% by mole based on the total number of moles of the content (number of moles) of the carbon-carbon double bonds contained in the fluorine-containing prepolymer (I) and the number of moles of the carbon-carbon unsaturated bonds of the curing agent.

To the material of the present invention may be added various additives as case demands in addition to the above-mentioned compounds in the range where near infrared transparency is not lowered.

Examples of the additives are, for instance, a leveling agent, viscosity control agent, light-stabilizer, moisture absorbing agent, pigment, dye, reinforcing agent and the like.

The optical waveguide material of the present invention is, as explained infra, dissolved or dispersed in a solvent and is used for production of various members for an optical waveguide.

The solvent to be used for making the solution is not limited particularly as far as the fluorine-containing prepolymer (I), active energy curing initiator (II) and additives to be added as case demands such as a curing agent, leveling agent and light stabilizer are uniformly dissolved or dispersed in it. Particularly preferred is a solvent dissolving the fluorine-containing prepolymer (I) uniformly.

Examples of the solvent are, for instance, cellosolve solvents such as methyl cellosolve, ethyl cellosolve, methyl cellosolve acetate and ethyl cellosolve acetate; ester solvents such as diethyl oxalate, ethyl pyruvate, ethyl-2-hydroxybutyrate, ethyl acetoacetate, butyl acetate, amyl acetate, ethyl butyrate, butyl butyrate, methyl lactate, ethyl lactate, methyl 3-methoxypropionate, ethyl 3-methoxypropionate, methyl 2-hydroxyisobutyrate and ethyl 2-hydroxyisobutyrate; propylene glycol solvents such as propylene glycol monomethyl ether, propylene glycol monoethyl ether, propylene glycol monobutyl ether, propylene glycol monomethyl ether acetate, propylene glycol monoethyl ether acetate, propylene glycol monobutyl ether acetate and dipropylene glycol dimethyl ether; ketone solvents such as 2-hexanone, cyclohexanone, methyl amino ketone and 2-heptanone; alcohol solvents such as methanol, ethanol, propanol, isopropanol and butanol; aromatic hydrocarbons such as toluene and xylene; a solvent mixture of two or more thereof and the like.

Also in order to enhance solubility of the fluorine-containing prepolymer (I), a fluorine-containing solvent may be used as case demands.

Examples of the fluorine-containing solvent are, for instance, $CH_3CCl_2F$ (HCFC-141b), a mixture of $CF_3CF_2CHCl_2$ and $CClF_2CF_2CHClF$ (HCFC-225), perfluorohexane, perfluoro(2-butyltetrahydrofuran), methoxy-nonafluorobutane, 1,3-bistrifluoromethylbenzene, and in addition, fluorine-containing alcohols such as:

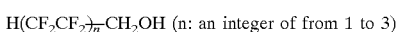

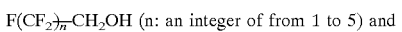

benzotrifluoride, perfluorobenzene, perfluoro(tributylamine), $ClCF_2CFClCF_2CFCl_2$ and the like.

Those fluorine-containing solvents may be used solely, in a mixture thereof or in a mixture of one or more of the fluorine-containing solvents and non-fluorine-containing solvents.

Among them, ketone solvents, acetic acid ester solvents, alcohol solvents and aromatic solvents are preferred from the viewpoint of coatability and productivity of a coating film.

The second of the present invention relates to the fluorine-containing optical waveguide member which is a cured article obtained by photo-curing the composition consisting of the fluorine-containing prepolymer (I) or comprising the fluorine-containing prepolymer (I) and the active energy curing initiator (II).

The cured article is one having a maximum absorption coefficient of not more than 1 $cm^{-1}$ in wavelength ranges of from 1,290 to 1,320 nm and from 1,530 to 1570 nm.

The optical waveguide member of the second invention is a member constituting the optical waveguide device and is formed on a substrate. The optical waveguide device is produced by connecting optical functional devices with an optical waveguide and the optical waveguide comprises a core portion and a clad portion. On the other hand, the optical functional device is a device undergoing functions of amplification, conversion of a wavelength, optical multiplex/demultiplex, selection of a wavelength, etc. There are various forms of functional devices and there are waveguide type functional devices for optical multiplex/demultiplex and optical amplification. In that case, the functional devices also comprise a core portion and a clad portion. The member of the present invention can be used on any of the core portion and clad portion. The member of the present invention may be used only on the core portion or the clad portion. Also it is possible to add various functional compounds, for example, a non-linear optical material, a functional organic pigment generating fluorescence, a photo-refractive material and the like to the member of the present invention and to use the member as a core material for a waveguide type functional device. Further it is preferable that the both of the core portion and the clad portion are cured articles obtained by curing the fluorine-containing prepolymer.

Namely, the third of the present invention relates to the optical waveguide device containing the member of the second invention.

When the optical waveguide device comprises a core portion and a clad portion, a refractive index of the core portion must be higher than that of the clad portion. A difference in the refractive index between the core portion and the clad portion is preferably not less than 0.003, more preferably not less than 0.01. Since the refractive index of the material and member of the present invention can be controlled in a wide range, the aimed materials can be selected among wide range.

In the optical waveguide device, a width of the core portion is preferably from 1 to 200 μm, more preferably from 5 to 50 μm. Also a preferred height of the core portion is from 5 to 50 μm. An accuracy of the width and height of the core portion is not more than 5%, more preferably not more than 1% of an average value.

FIG. 1 shows a diagrammatic cross-sectional view of a structure of a typical optical waveguide device. Numeral 1 represents a substrate, numeral 2 represents a core portion and numerals 4 and 5 represent clad portions. Such an optical waveguide device is used to connect optical functional devices. Light coming out from a terminal of one optical functional device is transmitted through the inside of the core portion 2 of the optical waveguide device to a terminal of another optical functional device while repeating total reflections, for example, on an interface between the core portion 2 and the clad portions 4 and 5. The optical waveguide device can be optionally formed into a plane, strip, ridge or embedded type.

A material of the substrate of the optical waveguide device is not limited particularly, and materials such as metal, semiconductor material, ceramic, glass, thermoplastic resin and thermo-setting resin can be used optionally.

FIG. 2 shows an example of production steps of an optical waveguide device using the material of the present invention. The optical waveguide device is produced using a photolithography technology. First, as shown in FIG. 2(a), a clad portion 4 is previously formed on a substrate 1, and then a film 3 of the material of the present invention which forms a core portion is formed. In forming the films of the optical waveguide materials which form the clad portion 4 and the core portion, it is preferable to coat the solutions of those materials by a coating means such as spin coating and cast coating, and the rotary coating is particularly preferred. Each of the solutions of materials is preferably prepared by dissolving in a solvent in a proper concentration for the thickness of each film and then filtrating, for example, through a filter having a pore size of about 0.2 μm.

The preferred concentration of each solution varies depending on a coating method. With respect to the resin for forming the core portion, the concentration is generally from 5 to 1,000 g, particularly preferably from 30 to 500 g per liter of a solvent, and with respect to the clad material, the concentration is generally from 1 to 1,000 g, particularly preferably from 30 to 500 g per liter of a solvent. The preferred concentration of a radiation-sensitive material is generally from 100 to 500 g, particularly preferably from 300 to 400 g per liter of a solvent.

As the solvent, there can be suitably used those mentioned above.

Figure 2A:
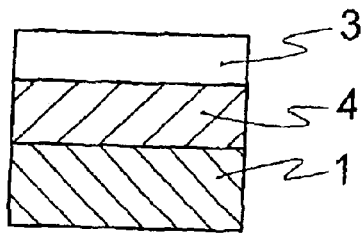
FIGS. 2(a)–2(d) represent a flow chart for explaining production steps of the optical waveguide device of the present invention.
Figure 2B:
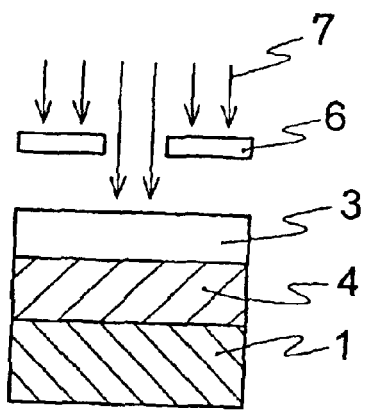
Figure 2C:
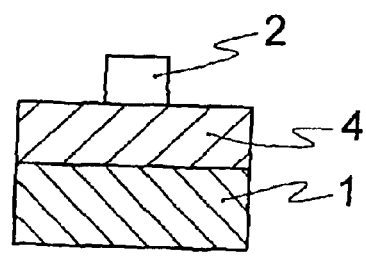
Figure 2D:
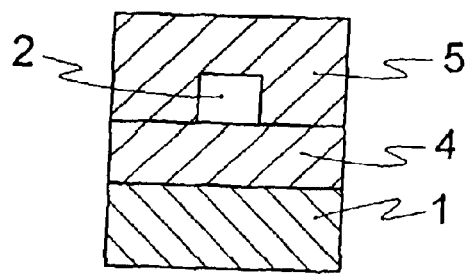

Then as shown in FIG. 2(b), the fluorine-containing prepolymer is irradiated with active energy ray 7 through a mask 6 having a specific pattern form. Then pre-baking is carried out as case demands. By photo-curing, the carbon-carbon double bonds in the fluorine-containing prepolymer (I) in the optical waveguide material of the present invention are polymerized between the molecules thereof and thereby the carbon-carbon double bonds in the polymer decrease or disappear. As a result, hardness of the resin becomes high, a mechanical strength and heat resistance are increased and further the resin becomes insoluble not only in a solvent in which the resin is soluble before the curing but also in many other kinds of solvents. Namely, the resin functions as a photoresist material. Then un-cured fluorine-containing prepolymer is dissolved and distilled off with a proper solvent to form the core portion 2 having a specific pattern as shown in FIG. 2(c). Though the optical waveguide device can be used as it is in the form having only the so-obtained core portion 2, it is preferable that after the formation of the core portion 2, the clad portion 5 is further formed as shown in FIG. 2(d). It is preferable that the clad portion 5 is formed by coating the solution of material by rotary coating, cast coating, roll coating or the like, and the rotary coating is particularly preferred. It is also preferable that the solution of material for the clad portion 5 is prepared by dissolving a specific material in a solvent and then filtrating, for example, with a filter having a pore size of about 0.2 μm.

In case where the clad portion 5 is produced from the optical waveguide material of the present invention, examples of a solvent for preparing the resin solution are, for instance, those exemplified in the above-mentioned core portion 2 and clad portion 4.

In case of use of a core material which is not photo-cured, it has been so far necessary to use a radiation-sensitive material. In that case, there is required a process for coating a radiation-sensitive material on the core material, irradiating radiation through a pattern and then dry-developing by silylation treatment and/or Germylation and reactive ion etching treatment. This process is very complicated, which is a factor for an increase in cost.

The present invention is then explained by means of examples and preparation examples, but is not limited to the examples.

In the following Examples and Preparation Examples, equipment and measuring conditions used for evaluation of physical properties are as follows.

(1) NMR: NMR analyzer is AC-300 available from BRUKER CO., LTD. Measuring conditions of $^1$H-NMR: 300 MHz (tetramethylsilane=0 ppm) Measuring conditions of $^{19}$F-NMR: 300 MHz (trichlorofluoromethane=0 ppm)

A ratio of conversion to $CH_2=CF-C(=O)-$ (α-fluoroacryloyl) (5.2 to 5.8 ppm (2H)) can be calculated from the data of $^1$H-NMR analysis, and a ratio of α-fluoroacryloyl group (−116 to −118 ppm (1F))/$CF_2$ and $CF_3$ in a side chain (−85 to −75 ppm (10F)) can be calculated from the data of $^{19}$F-NMR analysis by usual method.

(2) IR analysis: Measuring is carried out at room temperature with a Fourier-transform infrared spectrophotometer 1760x available from Perkin Elmer Co., Ltd.

(3) GPC: A number average molecular weight is calculated from data measured by gel permeation chromatography (GPC) by using GPC HLC-8020 available from Toso Kabushiki Kaisha and columns available from Shodex Co., Ltd. (one GPC KF-801, one GPC KF-802 and two GPC KF-806M were connected in series) and flowing tetrahydrofuran (THF) as a solvent at a flowing rate of 1 ml/minute.

PREPARATION EXAMPLE 1

Synthesis of Homopolymer of Fluorine-Containing Allyl Ether having OH Group

A 100 ml four-necked glass flask equipped with a stirrer and thermometer was charged with 20.4 g of perfluoro-(1,1,9,9-tetrahydro-2,5-bistrifluoromethyl-3,6-dioxanonenol):

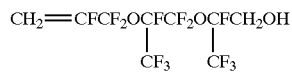

and 21.2 g of a perfluorohexane solution of 8.0% by weight of:

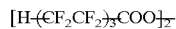

and after the inside of the flask was sufficiently replaced with nitrogen gas, stirring was carried out at 20° C. for 24 hours in nitrogen gas stream and a solid having a high viscosity was produced.

The obtained solid was dissolved in diethyl ether and then poured into perfluorohexane, followed by separating and vacuum-drying to obtain 17.6 g of a transparent colorless polymer.

According to $^{19}$F-NMR, $^1$H-NMR and IR analyses, the polymer was a fluorine-containing polymer consisting of the structural unit of the above-mentioned fluorine-containing allyl ether and having hydroxyl at an end of its side chain. The number average molecular weight of the polymer was 9,000 according to the GPC analysis using tetrahydrofuran (THF) as a solvent and the weight average molecular weight thereof was 22,000.

Example 1

Synthesis of Curable Fluorine-Containing Prepolymer (I) having α-Fluoroacryloyl Group A 200 ml four-necked flask equipped with a reflux condenser, thermometer, stirrer and dropping funnel was charged with 80 ml of diethyl ether, 5.0 g of the fluorine-containing allyl ether homopolymer having hydroxyl which was obtained in Preparation Example 1 and 1.0 g of pyridine, followed by cooling to 5° C. or lower with ice.

Then a solution obtained by dissolving 1.0 g of α-fluoroacrylic acid fluoride $CH_2=CFCOF$ in 20 ml of diethyl ether was added thereto dropwise over about 30 minutes while stirring in nitrogen gas stream.

After completion of the addition, the flask temperature was raised to room temperature and the stirring was further continued for 4.0 hours.

The ether solution after the reaction was put in the dropping funnel, followed by washing with water, 2% hydrochloric acid solution, 5% NaCl solution and water and then drying with anhydrous magnesium sulfate. Then the ether solution was separated by filtration. Thus a curable fluorine-containing prepolymer was obtained.

According to $^{19}$F-NMR analysis, the curable fluorine-containing prepolymer was a copolymer comprising a fluorine-containing allyl ether having

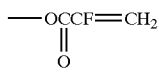

group and a fluorine-containing allyl ether having OH group in a ratio of 40/60% by mole.

The prepolymer was coated on a NaCl plate and formed into a cast film at room temperature. According to IR analysis of the cast film, an absorption of a carbon-carbon double bond was observed at 1,661 cm$^{-1}$, and an absorption of C=O group was observed at 1,770 cm$^{-1}$.

Example 2

Synthesis of Curable Fluorine-Containing Prepolymer (I) having α-Fluoroacryloyl Group A curable fluorine-containing prepolymer (ether solution) was synthesized in the same manner as in Example 1 except that 0.65 g of α-fluoroacrylic acid fluoride ($CH_2=CFCOF$) and 1.0 g of pyridine were used.

According to $^{19}$F-NMR analysis, the curable fluorine-containing prepolymer was a copolymer comprising a fluorine-containing allyl ether having

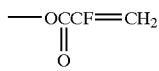

group and a fluorine-containing allyl ether having OH group in a ratio of 30/70% by mole.

According to IR analysis, an absorption of a carbon-carbon double bond and an absorption of C=O group were observed at the same positions, respectively as in Example 1.

Example 3

Synthesis of Curable Fluorine-Containing Prepolymer (I) having α-Fluoroacryloyl Group A curable fluorine-containing prepolymer (I) (ether solution) was synthesized in the same manner as in Example 1 except that 0.35 g of α-fluoroacrylic acid fluoride ($CH_2=CFCOF$) and 0.3 g of pyridine were used.

According to $^{19}$F-NMR analysis, the curable fluorine-containing prepolymer was a copolymer comprising a fluorine-containing allyl ether having

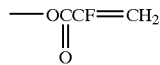

group and a fluorine-containing allyl ether having OH group in a ratio of 15/85% by mole.

According to IR analysis, an absorption of a carbon-carbon double bond and an absorption of C=O group were observed at the same positions, respectively as in Example 1.

Example 4

Evaluation of Physical Properties of Photo-Cured Film which is Optical Waveguide Member (1) Preparation of Optical Waveguide Material The curable fluorine-containing prepolymer obtained in Example 1 was dissolved in methyl ethyl ketone (MEK), and the concentration of the polymer was adjusted to 50% by weight.

To 10 g of the obtained curable fluorine-containing prepolymer solution was added, as an active energy curing initiator (photoradical generator), 1.7 g of a solution prepared by dissolving 2-hydroxy-2-methylpropiophenone in MEK in a concentration of 1% by weight. Thus an optical waveguide material was produced.

(2) Production of Film of Optical Waveguide Material

The optical waveguide material (50% solution in MEK of the fluorine-containing prepolymer) obtained in (1) above was coated on a polyester film with an applicator so that a coating thickness after the drying became a specific thickness (about 1 mm and about 100 μm). After vacuum-drying at 50° C. for ten minutes, the obtained cast film was peeled from the polyester film to produce optical waveguide materials in the form of un-cured films having a thickness of about 1 mm and about 100 μm.

(3) Production of Cured Film by Irradiation of Light

After the drying, the film obtained in (2) above was irradiated with ultraviolet light using a high pressure mercury lamp at room temperature at an intensity of 3,000 mJ/cm$^2$U to obtain a photo-cured film.

(4) Measurement of Physical Properties of Cured Film

The following physical properties of the obtained cured film were evaluated.

(i) Measurement of Absorption Coefficient

A spectral transmittance curve of an about 1 mm thick sample (cured film) was obtained at a wavelength of from 300 to 1,700 nm using a self-recording spectrophotometer (U-3410 available from Hitachi, Ltd.). An absorption coefficient was calculated from the obtained spectrum by the following equation.

Absorption coefficient=Absorbance/Thickness of sample

The results are shown in Table 1.

(ii) Measurement of Refractive Index

A refractive index of an about 100 μm thick sample (a film before and after curing) was measured using an Abbe's refractometer at 25° C. with light having a wavelength of 550 nm. The results are shown in Table 1.

(iii) Thermal Characteristic (DSC)

Thermal characteristics were measured at a temperature raising rate of 10° C./min using a differential calorimeter (DSC-50 available from Shimadzu Corporation), and it was found that any films had no clear crystalline melting point peak and were non-crystalline.

(iv) Evaluation of Solvent Resistance

An about 1 mm thick cured film was dipped in acetone and the condition thereof after a lapse of 24 hours at room temperature was observed with naked eyes and evaluated by the following criteria. The results are shown in Table 1.
◯: There is no change in appearance.
X: Dissolved in acetone.

(v) Evaluation of Heat Resistance

An about 1 mm thick cured film was allowed to stand at 150° C. for eight hours and a change in its form was observed and evaluated with naked eyes by the following criteria. The results are shown in Table 1.
◯: There is no change in appearance.
X: The film could not maintain its original form.

Examples 5 and 6

Production of films and evaluation of cured films were carried out in the same manner as in Example 4 except that the fluorine-containing prepolymers shown in Table 1 (those produced in Examples 2 and 3, respectively) were used instead of the fluorine-containing prepolymer having α-fluoroacryloyl group which was obtained in Example 1. The results are shown in Table 1. Thermal characteristics thereof were determined using DSC and it was recognized that any of the films before and after the curing were non-crystalline.

Comparative Example 1

With respect to the un-cured film which was not subjected to irradiation of light, physical properties were evaluated in the same manner as in Example 4. The results are shown in Table 1.

TABLE 1

|  | Ex. 4 | Ex. 5 | Ex. 6 | Com. Ex. 1 |
|---|---|---|---|---|
| Pre-polymer | Ex. 1 | Ex. 2 | Ex. 3 | Ex. 1 |
| Content of —O(C=O)CF=CH$_2$ group | 40 | 30 | 15 | 40 |
| Fluorine content (%) | 57 | 58 | 58 | 57 |
| Active energy curing initiator | 2-Hydroxy-2-methyl-propiophenone | 2-Hydroxy-2-methyl-propiophenone | 2-Hydroxy-2-methyl-propiophenone | 2-Hydroxy-2-methyl-propiophenone |
| Proportion to polymer (% by weight) | 2.1 | 2.1 | 2.1 | 2.1 |
| Amount of ultraviolet irradiation (mJ/cm$^2$) | 3000 | 3000 | 3000 | Not irradiated |

TABLE 1-continued

|  | Ex. 4 | Ex. 5 | Ex. 6 | Com. Ex. 1 |
|---|---|---|---|---|
| Refractive index | | | | |
| Before curing | 1.362 | 1.359 | 1.356 | 1.362 |
| After curing | 1.366 | 1.364 | 1.361 | — |
| Absorption coefficient ($cm^{-1}$) | | | | |
| 1,310 nm | 0.040 | 0.043 | 0.047 | 0.040 |
| 1,550 nm | 0.13 | 0.11 | 0.079 | 0.12 |
| Solvent resistance | ○ | ○ | ○ | X |
| Heat resistance | ○ | ○ | ○ | X |

Examples 7 to 10

Determination of Curing Reactivity by IR Analysis (1) Preparation of Optical Waveguide Material (Fluorine-Containing Resin Composition for Coating)

Respective coating compositions (optical waveguide materials) were prepared using the curable fluorine-containing prepolymer (I) obtained in Example 1 by the same procedures as in Example 4 so that the concentration of polymer and the amount of active energy curing initiator became those shown in Table 2.

(2) Production of Film for IR Analysis

The above-mentioned coating compositions were coated on a polyester film with an applicator so that a coating thickness after drying became about 100 μm, followed by drying at 50° C. for five minutes. Then the obtained coating films were peeled from the polyester film to obtain un-cured cast films.

(3) Measurement of Curing Reactivity by IR Analysis

According to IR analysis of the un-cured films, an absorption of a carbon-carbon double bond in the polymer was observed at 1,661 $cm^{-1}$.

(4) Measurement of Ratio of Curing Reaction

Attention was directed to the absorption of the carbon-carbon double bond, and a change in intensity of the absorption after the light irradiation was measured. A ratio of curing reaction was calculated by the following equation.

$$\left(1 - \frac{\text{Peak height at 1,661 cm}^{-1} \text{ after light irradiation}}{\text{Peak height at 1,661 cm}^{-1} \text{ before light irradiation}}\right) \times 100\%$$

The un-cured films obtained in (2) above were irradiated with ultraviolet light at room temperature in irradiation amounts shown in Table 2 using a high pressure mercury lamp, and cured films were obtained. The amount of irradiation was changed and the ratio of curing reaction represented by the above equation was calculated. The results are shown in Table 2.

TABLE 2

|  | Ex. 7 | Ex. 8 | Ex. 9 | Ex. 10 |
|---|---|---|---|---|
| Curable fluorine-containing polymer | Ex. 1 | Ex. 2 | Ex. 3 | Ex. 1 |
| Content of —O(C=O)CF=$CH_2$ group (% by mole) | 40 | 40 | 40 | 40 |
| Solvent | MEK | MEK | MEK | MEK |
| Concentration of polymer (% by weight) | 8 | 8 | 8 | 8 |
| Active energy curing initiator | 2-Hydroxy-2-methyl-propiophenone | 2-Hydroxy-2-methyl-propiophenone | 2-Hydroxy-2-methyl-propiophenone | 2-Hydroxy-2-methyl-propiophenone |
| Proportion to polymer (% by weight) | 4.2 | 2.1 | 1.0 | 0.2 |
| Ratio of curing reaction (%) Ultraviolet irradiation amount | | | | |
| 100 $mJ/cm^2$ | 100 (disappeared) | 60 | 45 | 34 |
| 500 $mJ/cm^2$ | — | 82 | 60 | 44 |
| 1,500 $mJ/cm^2$ | — | 100 (disappeared) | 74 | 55 |

Example 11

Synthesis of Curable Fluorine-Containing Prepolymer (I) having α-fluoroacryloyl Group A curable fluorine-containing prepolymer (I) (ether solution) was synthesized in the same manner as in Example 1 except that 2.0 g of α-fluoroacrylic acid fluoride ($CH_2$=CFCOF) and 2.0 g of pyridine were used.

According to $^{19}$F-NMR analysis, this fluorine-containing prepolymer was a copolymer comprising a fluorine-containing allyl ether having

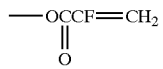

group and a fluorine-containing allyl ether having OH group in a ratio of 84:16% by mole.

According to IR analysis, an absorption of a carbon-carbon double bond and an absorption of C=O group were observed at the same positions as in Example 1, respectively.

Examples 12 to 14

Determination of Curing Reactivity by IR Analysis
(1) Preparation of Optical Waveguide Material (Fluorine-Containing Resin Composition for Coating)

Respective optical waveguide materials (coating compositions) were prepared using the curable fluorine-containing prepolymer (I) obtained in Example 11 by the same procedures as in Example 4 so that the concentration of polymer and kind and amount of active energy curing initiator became those shown in Table 3.
(2) Production of Film for IR Analysis The films were produced in the same manner as in Example 7.
(3) Measurement of Ratio of Curing Reaction by IR Analysis A ratio of curing reaction when light irradiation was carried out in an irradiation amount of 1,500 mJ/cm$^2$ was calculated in the same manner as in Example 7. The results are shown in Table 3.

Example 15

An optical waveguide material (fluorine-containing resin composition for coating) containing a curing agent was prepared by adding, as a curing agent,

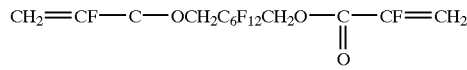

to the optical waveguide material (coating composition) obtained in Example 12 so that the amount thereof became 20% by weight based on the polymer.

A film for IR analysis was produced using this resin composition in the same manner as in Example 12, and a ratio of curing reaction was determined. The results are shown in Table 3.

ration Example 1 except that 20.0 g of perfluoro-(1,1,9,9-tetrahydro-2,5-bistrifluoromethyl-3,6-dioxanonenol) and 10.0 g of a perfluorohexane solution of 8.0% by weight of:

were used. Thus 18.2 g of a transparent colorless polymer was obtained.

According to $^{19}$F-NMR, $^1$H-NMR and IR analyses, the obtained polymer was a fluorine-containing polymer consisting of the structural unit of the above-mentioned fluorine-containing allyl ether and having hydroxyl at an end of its side chain. The number average molecular weight of the polymer was 30,000 according to the GPC analysis using tetrahydrofuran (THF) as a solvent and the weight average molecular weight thereof was 59,000.

Preparation Example 3

Synthesis of Copolymer Comprising Fluorine-Containing Allyl Ether having OH Group and Vinylidene Fluoride A 300 ml stainless steel autoclave equipped with a valve, pressure gauge and thermometer was charged with 34.2 g of perfluoro-(1,1,9,9-tetrahydro-2,5-bistrifluoromethyl-3,6-dioxanonenol), 200 g of CH$_3$CCl$_2$F (HCFC-141b) and 0.16 g of methanol solution of 50% by weight of dinormalpropyl peroxy carbonate (NPP). While cooling with dry ice/methanol solution, the inside of a system was sufficiently replaced with nitrogen gas. Then 5.8 g of vinylidene fluoride (VdF) was introduced through the valve, followed by a reaction while shaking at 40° C. With the advance of the reaction, 12 hours after starting of the reaction, a gauge pressure inside the system lowered from 4.4 MPaG (4.5 kgf/cm$^2$G) before the reaction to 0.98 MPaG (1.0 kgf/cm$^2$G).

At that time, un-reacted monomer was released and a precipitated solid was removed and dissolved in acetone, followed by re-precipitation with a solvent mixture of hexane and toluene (50/50) to separate a copolymer. The copolymer was vacuum-dried until a constant weight was reached. Thereby 31.2 g of a copolymer was obtained.

TABLE 3

|  | Ex. 12 | Ex. 13 | Ex. 14 | Ex. 15 |
| --- | --- | --- | --- | --- |
| Curable fluorine-containing polymer | Ex. 11 | Ex. 11 | Ex. 11 | Ex. 11 |
| Content of —O(C=O)CF=CH$_2$ group (% by mole) | 84 | 84 | 84 | 84 |
| Solvent | MEK | MEK | MEK | MEK |
| Concentration of polymer (% by weight) | 8 | 8 | 8 | 8 |
| Active energy curing initiator | 2-Hydroxy-2-methyl-propiophenone | 2,2-dimethoxy-2-phenyl-acetophenone | Benzophenone | 2-Hydroxy-2-methyl-propiophenone |
| Proportion to polymer (% by weight) | 2.0 | 2.0 | 2.0 | 2.0 |
| Curing agent | — | — | — | Polyfunctional acryl[1)] |
| Proportion to polymer (% by weight) | — | — | — | 20 |
| Ratio of curing reaction (%) (at 1,500 mJ/cm$^2$) | 73.9 | 55.0 | 40.6 | 84.0 |

[1)]Polyfunctional acryl: CHhd 2=CF(C=O)OCH$_2$—(CF$_2$)$_6$—CH$_2$O(C=O)CF=CH$_2$ Preparation Example 2

Synthesis of Fluorine-Containing Allyl Ether Homopolymer having OH Group

Synthesis of a polymer and refining of the obtained polymer were carried out in the same manner as in Preparation The components of the copolymer were VdF and the fluorine-containing allyl ether having OH group in a ratio of 55:45% by mole according to $^1$H-NMR and $^{19}$F-NMR analyses. The number average molecular weight of the copolymer was 12,000 according to the GPC analysis using THF as a solvent and the weight average molecular weight thereof was 18,000.

Preparation Example 4

Synthesis of Fluorine-Containing Active Energy Curing Initiator

A 200 ml four-necked flask equipped with a reflux condenser, thermometer, stirrer and dropping funnel was charged with 2.0 g of 2-hydroxy-2-methylpropiophenone, 1.0 g of pyridine and 20 g of a mixture (HCFC-225) of $CF_3CF_2CHCl/CClF_2CF_2CHClF$ and was cooled to 5° C. or lower with ice.

Thereto was added dropwise 2.5 g of:

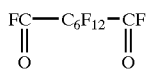

over one hour with stirring in nitrogen gas stream. After completion of the addition, the stirring was further continued for 4.0 hours.

After the reaction, the ether solution was put in the dropping funnel and washed with 2% hydrochloric acid solution and 5% NaCl solution, followed by separation of an organic layer, drying with anhydrous magnesium sulfate and distillation to isolate 2.6 g of a product (yield: 62%).

According to $^1$H-NMR, $^{19}$F-NMR and IR analyses, the product was:

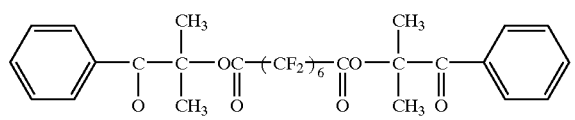

Example 16

Synthesis of Curable Fluorine-Containing Prepolymer (I) having αFluoroacryloyl Group A 200 ml four-necked flask equipped with a reflux condenser, thermometer, stirrer and dropping funnel was charged with 40 ml of methyl ethyl ketone (MEK), 5.0 g of the fluorine-containing allyl ether homopolymer having hydroxyl which was obtained in Preparation Example 2 and 2.0 g of pyridine, and was cooled to 5° C. or lower with ice.

Thereto was added dropwise 1.2 g of α-fluoroacrylic acid fluoride over about 30 minutes with stirring in nitrogen gas stream. After completion of the addition, the flask temperature was raised to room temperature and the stirring was further continued for 4.0 hours.

After the reaction, the MEK solution was put in the dropping funnel and washed with water, 2% hydrochloric acid solution, 5% NaCl solution and water, followed by separation of an organic layer and drying with anhydrous magnesium sulfate to obtain a curable fluorine-containing prepolymer. A concentration of the polymer after filtrating was 10.7% by weight.

According to $^{19}$F-NMR analysis, the obtained fluorine-containing prepolymer was a copolymer comprising a fluorine-containing allyl ether having

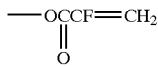

group and a fluorine-containing allyl ether having OH group in a ratio of 30:70% by mole.

According to IR analysis which was carried out in the same manner as in Example 1, an absorption of a carbon-carbon double bond and an absorption of C=O group were observed at 1,660 cm$^{-1}$ and 1,770 cm$^{-1}$, respectively.

Example 17

Synthesis of Curable Fluorine-Containing Prepolymer (I) having α-Fluoroacryloyl Group A curable fluorine-containing prepolymer (I) (MEK solution) was synthesized in the same manner as in Example 16 except that 5.0 g of the copolymer comprising the fluorine-containing allyl ether having OH group and VdF which was obtained in Preparation Example 3, 1.1 g of pyridine and 1.0 g of α-fluoroacrylic acid fluoride were used. A concentration of the polymer was 9.9% by weight.

According to $^{19}$F-NMR analysis, the obtained prepolymer was a copolymer comprising a fluorine-containing allyl ether having —

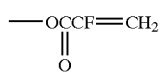

group and a fluorine-containing allyl ether having OH group in a ratio of 15:85% by mole.

Example 18

Evaluation of Physical Properties of Photo-Cured Film which is an Optical Waveguide Member (1) Preparation of Optical Waveguide Material MEK was added to the fluorine-containing prepolymer (MEK solution) obtained in Example 16 to adjust the concentration of polymer to 50% by weight.

To the MEK solution of the fluorine-containing prepolymer was added 2-hydroxy-2-methylpropiophenone as the active energy curing initiator so that its amount became 2.0% by weight based on the polymer. However the solution became turbid in white and there could not be obtained compatibility therebetween.

Therefore the fluorine-containing active energy curing initiator obtained in Preparation Example 4 was added instead of 2-hydroxy-2-methylpropiophenone so that its amount became 3.6% by weight based on the polymer. As a result, a transparent colorless solution was obtained and there was compatibility therebetween. The solution is the optical waveguide material.

(2) Evaluation of Photo-Cured Film of Optical Waveguide Material

Evaluation was carried out in the same manner as in (2) to (4) of Example 4 (an irradiation amount in (3) was 1,500 mJ/cm$^2$) using the optical waveguide material (coating composition) containing the curing initiator which was prepared in (1) above, and a ratio of curing reaction when irradiating light at 1,500 mJ/cm$^2$ was measured in the same manner as in Example 8. The results are shown in Table 4. It was determined by DSC analysis that the material was non-crystalline.

Example 19

Evaluation of Physical Properties of Photo-Cured Film which is an Optical Waveguide Member (1) Preparation of Optical Waveguide Material MEK was further added to the fluorine-containing prepolymer (MEK solution) which was obtained in Example 17 to adjust the polymer concentration to 8% by weight.

To this MEK solution of fluorine-containing prepolymer was added 2-hydroxy-2-methylpropiophenone as the active energy curing initiator so that its amount became 6.7% by weight based on the polymer. As a result, a transparent colorless solution was obtained and there was compatibility therebetween. The solution is the optical waveguide material. It was determined by DSC analysis that the material was non-crystalline.

(2) Evaluation of Photo-Cured Film of Optical Waveguide Material

Evaluation was carried out in the same manner as in Example 18 using the obtained optical waveguide material (coating composition). The results are shown in Table 4.

end of its side chain. The weight average molecular weight (Mw) of the polymer was 21,000 according to the GPC analysis using tetrahydrofuran (THF) as a solvent and a ratio (Mw/Mn) thereof to the number average molecular weight (Mn) was 1.3.

Also a 5% by weight decomposition temperature measured by the following method was 360° C.

(Measurement of 5% by Weight Decomposition Temperature)

The polymer is heated at a temperature increasing rate of 10° C./min with dry air of 200 ml/min using TG/DTA (TG/DTA220 available from Seiko Denshi Kabushiki Kaisha) and a temperature when 5% by weight of thermal

TABLE 4

|  | Ex. 18 | Ex. 19 |
|---|---|---|
| Pre-polymer | Ex. 16 | Ex. 17 |
| Content of —O(C=O)CF=CH$_2$ group | 89 | 35 |
| Fluorine content (%) | 56 | 57 |
| Active energy curing initiator | Fluorine-containing initiator of Prep. Ex. 4 | 2-Hydroxy-2-methyl-propiophenone |
| Proportion to polymer (% by weight) | 3.6 | 6.7 |
| Ultraviolet irradiation amount (mJ/cm) | 1500 | 1500 |
| Ratio of curing reaction | 88.7 | 75.7 |
| Refractive index | | |
| Before curing | 1.368 | 1.369 |
| After curing | 1.375 | 1.377 |
| Absorption coefficient (cm$^{-1}$) | | |
| 1,310 nm | 0.026 | 0.051 |
| 1,550 nm | 0.22 | 0.28 |
| Solvent resistance | ◯ | ◯ |
| Heat resistance | ◯ | ◯ |

Preparation Example 5

Synthesis of Copolymer of Fluorine-Containing Allyl Ether having OH Group

A 100 ml four-necked glass flask equipped with a stirrer and thermometer was charged with 5.2 g of perfluoro-(1,1,9,9-tetrahydro-2,5-bistrifluoromethyl-3,6-dioxanonenol):

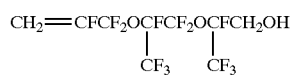

(hereinafter referred to as "fluorine-containing allyl ether A") and 14.2 g of:

(hereinafter referred to as "fluorine-containing allyl ether B"), followed by sufficiently replacing the inside of the flask with nitrogen gas and stirring at 20° C. for 24 hours in nitrogen gas stream. Thereby a solid having a high viscosity was produced.

The obtained solid was dissolved in diethyl ether and then poured into perfluorohexane, followed by separating and vacuum-drying to obtain 12.2 g of a transparent colorless polymer.

According to $^{19}$F-NMR, $^1$H-NMR and IR analyses, the polymer was a fluorine-containing polymer comprising the structural units of the above-mentioned two kinds of fluorine-containing allyl ethers and having hydroxyl at an decomposition (weight reduction) arises is assumed to be the 5% by weight decomposition temperature.

Preparation Examples 6 to 9

Synthesis of Fluorine-Containing Allyl Ether Homopolymer and Copolymer Having OH Group Polymerization was carried out in the same manner as in Preparation Example 5 except that the amounts of the two kinds of fluorine-containing allyl ethers A and B were changed to those shown in Table 5. Thereby fluorine-containing copolymers comprising the structural units of the above-mentioned two kinds of fluorine-containing allyl ethers and having hydroxyl at an end of a side chain thereof (Preparation Examples 6, 7 and 9) and a homopolymer of the fluorine-containing allyl ether A (Preparation Example 8) were obtained. Physical properties of those polymers are shown in Table 5.

TABLE 5

|  | Preparation Example | | | | |
|---|---|---|---|---|---|
|  | 5 | 6 | 7 | 8 | 9 |
| Fluorine-containing allyl ether | | | | | |
| A (g) | 5.2 | 10.3 | 15.3 | 30.2 | 72.1 |
| B (g) | 14.2 | 9.5 | 4.8 | 0 | 8.3 |
| Amount of prepared polymer (g) | 12.2 | 13.1 | 13.1 | 19.6 | 50.2 |

TABLE 5-continued

| | Preparation Example | | | | |
|---|---|---|---|---|---|
| | 5 | 6 | 7 | 8 | 9 |
| Physical properties of polymer | | | | | |
| Mw (×10⁴) | 2.1 | 2.2 | 2.7 | 3.0 | 1.9 |
| Mw/Mn | 1.3 | 1.5 | 1.5 | 1.7 | 1.5 |
| 5% Decomposition temperature (° C.) | 360 | 364 | 364 | 381 | 370 |

Examples 20 to 24

Synthesis of Curable Fluorine-Containing Prepolymer (I) Having α-Fluoroacryloyl Group Curable fluorine-containing prepolymers having α-fluoroacryloyl group were synthesized in the same manner as in Example 1 except that the fluorine-containing allyl ether polymers having OH group which were prepared in Preparation Examples 5 to 9 were used instead of the fluorine-containing allyl ether polymer having OH group which was prepared in Preparation Example 1 in amounts shown in Table 6 under the reaction conditions shown in Table 6.

According to $^{19}$F-NMR analysis of the obtained curable fluorine-containing prepolymer, contents (% by mole) of the structural units derived from the fluorine-containing allyl ethers A and B having OH group were as shown in Table 6.

According to IR analysis of cast films which were obtained by coating the polymer on a NaCl plate and drying at room temperature, an absorption of a carbon-carbon double bond and an absorption of C=O group were observed around 1,661 cm$^{-1}$ and around 1,770 cm$^{-1}$, respectively.

TABLE 6

| | Example | | | | |
|---|---|---|---|---|---|
| | 20 | 21 | 22 | 23 | 24 |
| Polymer having OH group | | | | | |
| Preparation Example | 5 | 6 | 7 | 8 | 9 |
| Amount (g) | 7.4 | 7.0 | 7.0 | 6.9 | 40.2 |

TABLE 6-continued

| | Example | | | | |
|---|---|---|---|---|---|
| | 20 | 21 | 22 | 23 | 24 |
| α-Fluoroacrylic acid fluoride (g) | 1.0 | 1.8 | 2.6 | 3.1 | 18.3 |
| MEK (g) | 30 | 30 | 30 | 30 | 200 |
| Pyridine (g) | 1.0 | 1.9 | 2.6 | 3.2 | 18.5 |
| Reaction time | 4.5 | 4.5 | 4.5 | 4.0 | 4.5 |
| Fluorine content (% by weight) | 62 | 59 | 57 | 55 | 56 |
| Fluorine-containing allyl ether A (% by mole) | 27 | 53 | 78 | 100 | 88 |
| Fluorine-containing allyl ether B (% by mole) | 73 | 47 | 22 | 0 | 12 |

Examples 25 to 29

Evaluation of Physical Properties of Photo-Cured Film which is an Optical Waveguide Member)

Production of films and evaluation of cured films were carried out in the same manner as in Example 4 except that the fluorine-containing prepolymers shown in Table 7 (those prepared in Examples 20 to 24, respectively) were used instead of the fluorine-containing prepolymer having α-fluoroacryloyl group which was prepared in Example 1. The results are shown in Table 7. It was determined according to DSC analysis that the obtained prepolymers were non-crystalline.

TABLE 7

| | Ex. 25 | Ex. 26 | Ex. 27 | Ex. 28 | Ex. 29 |
|---|---|---|---|---|---|
| Pre-polymer | Ex. 20 | Ex. 21 | Ex. 22 | Ex. 23 | Ex. 24 |
| Content of —O(C=O)CF=CH$_2$ group (% by mole) | 27 | 53 | 78 | 100 | 88 |
| Fluorine content (% by weight) | 62 | 59 | 57 | 55 | 56 |
| Active energy curing initiator | 2-Hydroxy-2-methyl-propiophenone | 2-Hydroxy-2-methyl-propiophenone | 2-Hydroxy-2-methyl-propiophenone | 2-Hydroxy-2-methyl-propiophenone | 2-Hydroxy-2-methyl-propiophenone |
| Proportion to polymer (% by weight) | 2.0 | 2.0 | 2.0 | 2.0 | 2.0 |
| Ultraviolet irradiation amount (mJ/cm) | 1800 | 1800 | 1800 | 1800 | 1800 |
| Refractive index | | | | | |
| Before curing | 1.342 | 1.354 | 1.364 | 1.371 | 1.368 |
| After curing | 1.352 | 1.361 | 1.369 | 1.381 | 1.375 |
| Solvent resistance | ○ | ○ | ○ | ○ | ○ |
| Heat resistance | ○ | ○ | ○ | ○ | ○ |

Example 30

Evaluation of Physical Properties of Photo-Cured Film which is an Optical Waveguide Member)

(1) Preparation of Optical Waveguide Material

The curable fluorine-containing prepolymer obtained in Example 24 was dissolved in propylene glycol monomethyl ether acetate (PGMEA) to obtain a solution having a prepolymer concentration of 40% by weight.

To 10 g of the PGMEA solution of fluorine-containing prepolymer was added 1.5 g of MEK solution of 1% by weight of the compound obtained in Preparation Example 4 as an active energy curing initiator (photoradical initiator) to prepare an optical waveguide material for coating.

(2) Production of Photo-Cured Film of Optical Waveguide Material

The optical waveguide material (coating composition) was spin-coated on a 5 inch silicon wafer to obtain an un-cured film having a thickness of 10 μm. After drying, this film was irradiated with ultraviolet light at room temperature at an intensity of 1,800 mJ/cm²U with a high pressure mercury lamp to produce a photo-cured film.

(3) Evaluation of Photo-Cured Film of Optical Waveguide Material

A refractive index in a near infrared region (1,300 nm and 1,550 nm) of the obtained cured film was measured with a Prism Coupler (Model 2010, trade name) available from Metricon Co., Ltd. The refractive indices at 1,300 nm and 1,550 nm were 1.373 and 1.371, respectively.

Example 31

Evaluation of Physical Properties of Photo-Cured Film which is an Optical Waveguide Member)

(1) Preparation of Optical Waveguide Material

The optical waveguide material for coating which was obtained in (1) of Example 30 was used.

(2) Production of Photo-Cured Film of Optical Waveguide Material

A specific amount of the optical waveguide material (coating composition) was poured into a concave of 15 mm×15 mm×1 mm and three kinds of un-cured cast films having different thicknesses were obtained. After drying, those films were irradiated with ultraviolet light at room temperature at an intensity of 1,800 mJ/cm²U with a high pressure mercury lamp to produce photo-cured films having different thicknesses (thickness: 280 μm, 450 μm and 1,020 μm).

(3) Evaluation of Photo-Cured Film of Optical Waveguide Material

An intensity of absorption of the photo-cured film was measured every 1 nm in the wavelength range of from 900 to 1,700 nm using a high sensitivity spectrophotometer (MAC-1, trade name) available from JASCO Corporation (measuring temperature: 24° C.). An intensity of absorption of the photo-cured films having different thicknesses was also measured in the same manner as above. An effect of a surface reflection was eliminated by standardizing the intensity of absorption for each thickness and an absorption loss of the material was evaluated. The results are shown in FIG. 3.

Figure 3:
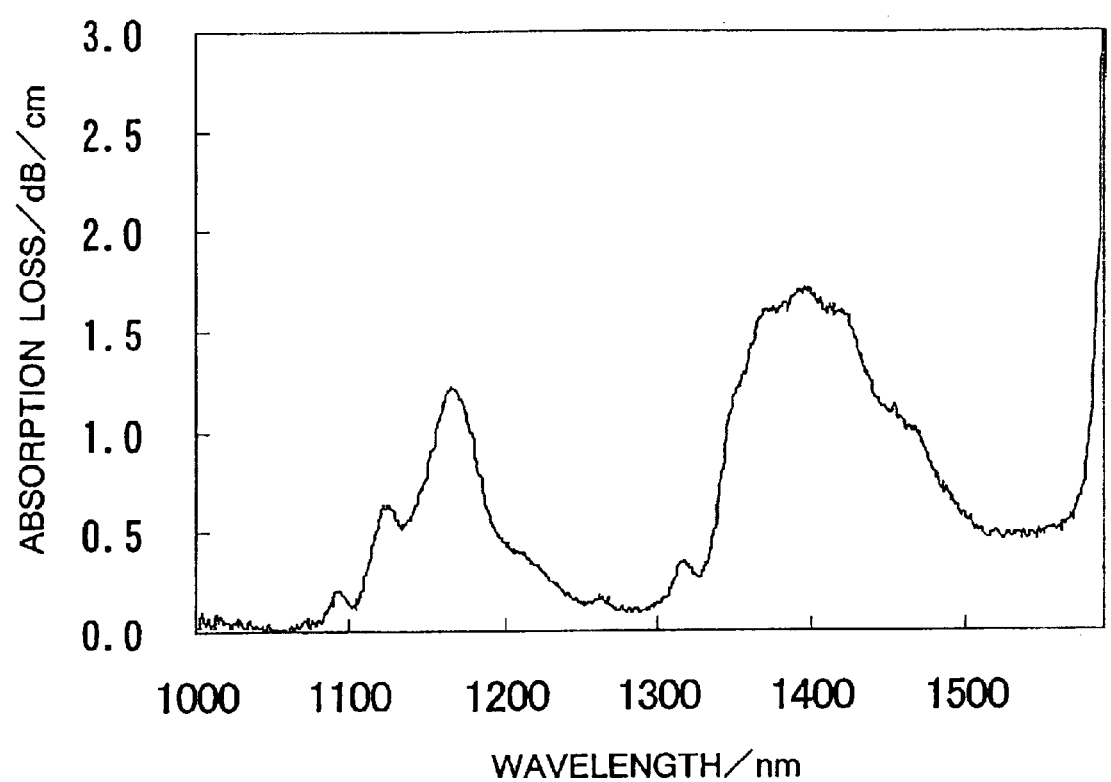
FIG. 3 is a graph showing an absorption loss at each wavelength of a photo-cured film produced in Example 31.

It can be seen from FIG. 3 that values of an absorption loss at 1,300 nm and 1,550 nm were 0.1 dB/cm and 0.5 dB/cm, respectively and very excellent transparency is exhibited in a near infrared region.

Example 32

Production of Optical Waveguide Device

An optical waveguide in an optical waveguide device was formed by the following procedures.

The optical waveguide was produced using the optical waveguide material prepared in Example 16 as a material for a core portion and the fluorine-containing prepolymer prepared in Example 1 as a material for a clad portion.

Those two materials were dissolved in methyl isobutyl ketone to make the respective solutions. First, the material for the clad portion was coated on a plastic substrate or a silicon substrate in a thickness of about 15 μm. After baking and drying, on the film of the material for the clad portion was coated the material for the core portion in a thickness of about 8 μm. Then the film of the material for the core portion was irradiated with light through a photomask for curing. After that, un-cured part of the core film was flowed away with a solvent to make a linear rectangular pattern of the core portion of 50 mm long×8 μm wide×8 μm high. Then as explained by means of FIG. 2, a clad portion was formed on the core portion to make an optical waveguide.

Next, a transmission loss of the produced waveguide was measured by passing light having a wavelength of 1,300 nm through the core portion. As a result, the transmission loss was 0.5 dB/cm.

Further the produced optical waveguide was allowed to stand at a temperature of 80° C. at a humidity of 85% RH for one week. The transmission loss did not change at all.

According to the present invention, there can be provided the optical waveguide material in which the polymer can have heat resistance and high elasticity by photo-curing while maintaining near infrared transparency.

Further when the cured article obtained from the optical waveguide material is used as the optical waveguide member, there can be provided the optical waveguide device having heat resistance, small water absorption and improved near infrared transparency.

What is claimed is:

1. An optical waveguide comprising a core portion and a clad portion, wherein at least one of the core portion and clad portion is obtained from a cured article produced by curing a curable fluorine-containing prepolymer (I) which:
    (1) is a non-crystalline polymer having a fluorine content of not less than 25% by weight,
    (2) has a carbon-carbon double bond in the polymer side chain and/or at an end of the polymer trunk chain, and
    (3) has a number average molecular weight of 5000 to 100000.

2. The optical waveguide of claim 1, wherein the fluorine-containing prepolymer (I) is a polymer having a maximum absorption coefficient of not more than 1 cm$^{-1}$ in a wavelength range of from 1,290 to 1,320 nm.

3. The optical waveguide of claim 1, wherein the fluorine-containing prepolymer (I) is a polymer having a maximum absorption coefficient of not more than 1 cm$^{-1}$ in a wavelength range of from 1,530 to 1,570 nm.

4. The optical waveguide of claim 1, wherein the fluorine-containing prepolymer (I) has a carbon-carbon double bond at an end of its side chain.

5. The optical waveguide of claim 1, wherein the fluorine-containing prepolymer (I) is a fluorine-containing polymer having a number average molecular weight of from 5000 to 100000 and represented by the formula (1):

in which the structural unit M is a structural unit derived from a fluorine-containing ethylenic monomer and represented by the formula (M):

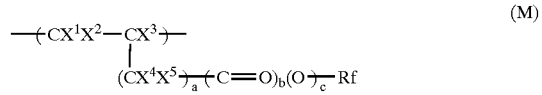

wherein $X^1$ and $X^2$ are the same or different and each is H or F; $X^3$ is H, F, $CH_3$ or $CF_3$; $X^4$ and $X^5$ are the same or different and each is H, F or $CF_3$; Rf is an organic group in which 1 to 3 of $Y^1$ ($Y^1$ is a monovalent organic group having 2 to 10 carbon atoms and an ethylenic carbon-carbon double bond at its end) are bonded to a fluorine-containing alkyl group having 1 to 40 carbon atoms or a fluorine-containing alkyl group having 2 to 100 carbon atoms and ether bond; a is 0 or an integer of from 1 to 3; b and c are the same or different and each is 0 or 1, the structural unit A is a structural unit derived from monomer copolymerizable with the fluorine-containing ethylenic monomer providing the structural unit M,
and the structural unit M and the structural unit A are contained in amounts of from 0.1 to 100% by mole and from 0 to 99.9% by mole, respectively.

6. The optical waveguide of claim 5, wherein the fluorine-containing prepolymer (I) is the fluorine-containing polymer of the formula (1) and the structural unit M is a structural unit M1 derived from a fluorine-containing ethylenic monomer and represented by the formula (M1):

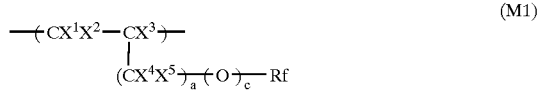
(M1)

wherein $X^1$ and $X^2$ are the same or different and each is H or F; $X^3$ is H, F, $CH_3$ or $CF_3$; $X^4$ and $X^5$ are the same or different and each is H, F or $CF_3$; Rf is an organic group in which 1 to 3 of $Y^1$ ($Y^1$ is a monovalent organic group having 2 to 10 carbon atoms and an ethylenic carbon-carbon double bond at its end) are bonded to a fluorine-containing alkyl group having 1 to 40 carbon atoms or a fluorine-containing alkyl group having 2 to 100 carbon atoms and ether bond; a is 0 or an integer of from 1 to 3; c is 0 or 1.

7. The optical waveguide of claim 5, wherein the fluorine-containing prepolymer (I) is the fluorine-containing polymer of the formula (1) and the structural unit M is a structural unit M2 derived from a fluorine-containing ethylenic monomer and represented by the formula (M2):

(M2)

wherein Rf is an organic group in which 1 to 3 of $Y^1$ ($Y^1$ is a monovalent organic group having 2 to 10 carbon atoms and an ethylenic carbon-carbon double bond at its end) are bonded to a fluorine-containing alkyl group having 1 to 40 carbon atoms or a fluorine-containing alkyl group having 2 to 100 carbon atoms and ether bond.

8. The optical waveguide of claim 5, wherein the fluorine-containing prepolymer (I) is the fluorine-containing polymer of the formula (1) and the structural unit M is a structural unit M3 derived from a fluorine-containing ethylenic monomer and represented by the formula (M3):

(M3)

wherein Rf is an organic group in which 1 to 3 of $Y^1$ ($Y^1$ is a monovalent organic group having 2 to 10 carbon atoms and an ethylenic carbon-carbon double bond at its end) are bonded to a fluorine-containing alkyl group having 1 to 40 carbon atoms or a fluorine-containing alkyl group having 2 to 100 carbon atoms and ether bond.

9. The optical waveguide of claim 5, wherein at least one of $Y^1$ of Rf in said formula (M) is bonded to an end of Rf.

10. The optical waveguide of claim 9, wherein $Y^1$ of Rf in said formula (M) is:

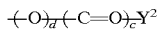

wherein —$Y^2$ is an alkenyl group or fluorine-containing alkenyl group having 2 to 5 carbon atoms and an ethylenic carbon-carbon double bond at its end; d and e are the same or different and each is 0 or 1.

11. The optical waveguide of claim 9, wherein $Y^1$ of Rf in said formula M) is:

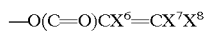
—O(C=O)$CX^6$=$CX^7X^8$ wherein $X^6$ is H, F, $CH_3$ or $CF_3$; $X^7$ and $X^8$ are the same or different and each is H or F.

12. The optical waveguide of claim 1, wherein a maximum absorption coefficient of the cured article is not more than 1 $cm^{-1}$ in a wavelength range of from 1,290 to 1,320 nm.

13. The optical waveguide of claim 1, wherein a maximum absorption coefficient of the cured article is not more than 1 $cm^{-1}$ in a wavelength range of from 1,530 to 1,570 nm.

14. An optical waveguide type functional device comprising a core portion and a clad portion, wherein at least one of the core portion and clad portion is obtained from a cured article produced by curing a curable fluorine-containing prepolymer (I) which:
  (1) is a non-crystalline polymer having a fluorine content of not less than 25% by weight,
  (2) has a carbon-carbon double bond in the polymer side chain and/or at an end of the polymer trunk chain, and
  (3) has a number average molecular weight of 5000 to 100000.

15. The optical waveguide type functional device of claim 14, wherein the fluorine-containing prepolymer (I) is a polymer having a maximum absorption coefficient of not more than 1 $cm^{-1}$ in a wavelength range of from 1,290 to 1,320 nm.

16. The optical waveguide type functional device of claim 14, wherein the fluorine-containing prepolymer (I) is a polymer having a maximum absorption coefficient of not more than 1 $cm^{-1}$ in a wavelength range of from 1,530 to 1,570 nm.

17. The optical waveguide type functional device of claim 14, wherein the fluorine-containing prepolymer (I) has a carbon-carbon double bond at an end of its side chain.

18. The optical waveguide type functional device of claim 14, wherein the fluorine-containing prepolymer (I) is a fluorine-containing polymer having a number average molecular weight of from 5000 to 100000 and represented by the formula (1):

(1)

in which the structural unit M is a structural unit derived from a fluorine-containing ethylenic monomer and represented by the formula (M):

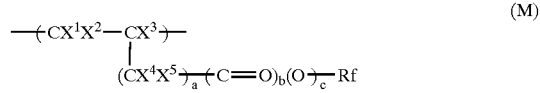
(M)

wherein $X^1$ and $X^2$ are the same or different and each is H or F; $X^3$ is H, F, $CH_3$ or $CF_3$; $X^4$ and $X^5$ are the same or different and each is H, F or $CF_3$; Rf is an organic group in which 1 to 3 of $Y^1$ ($Y^1$ is a monovalent organic group having 2 to 10 carbon atoms and an ethylenic carbon-carbon double bond at its end) are bonded to a fluorine-containing alkyl group having 1 to 40 carbon atoms or a fluorine-containing alkyl group having 2 to 100 carbon atoms and ether bond; a is 0 or an integer of from 1 to 3; b and c are the same or different and each is 0 or 1, the structural unit A is a structural unit derived from monomer copolymerizable with the fluorine-containing ethylenic monomer providing the structural unit M,
and the structural unit M and the structural unit A are contained in amounts of from 0.1 to 100% by mole and from 0 to 99.9% by mole, respectively.

19. The optical waveguide type functional device of claim 18, wherein the fluorine-containing prepolymer (I) is the fluorine-containing polymer of the formula (1) and the structural unit M is a structural unit M1 derived from a fluorine-containing ethylenic monomer and represented by the formula (M1):

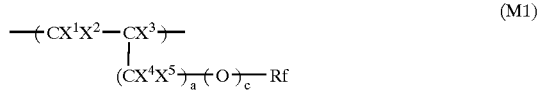

(M1)

wherein $X^1$ and $X^2$ are the same or different and each is H or F; $X^3$ is H, F, $CH_3$ or $CF_3$; $X^4$ and $X^5$ are the same or different and each is H, F or $CF_3$; Rf is an organic group in which 1 to 3 of $Y^1$ ($Y^1$ is a monovalent organic group having 2 to 10 carbon atoms and an ethylenic carbon-carbon double bond at its end) are bonded to a fluorine-containing alkyl group having 1 to 40 carbon atoms or a fluorine-containing alkyl group having 2 to 100 carbon atoms and ether bond; a is 0 or an integer of from 1 to 3; c is 0 or 1.

20. The optical waveguide type functional device of claim 18, wherein the fluorine-containing prepolymer (I) is the fluorine-containing polymer of the formula (1) and the structural unit M is a structural unit M2 derived from a fluorine-containing ethylenic monomer and represented by the formula (M2):

(M2)

wherein Rf is an organic group in which 1 to 3 of $Y^1$ ($Y^1$ is a monovalent organic group having 2 to 10 carbon atoms and an ethylenic carbon-carbon double bond at its end) are bonded to a fluorine-containing alkyl group having 1 to 40 carbon atoms or a fluorine-containing alkyl group having 2 to 100 carbon atoms and ether bond.

21. The optical waveguide type functional device of claim 18, wherein the fluorine-containing prepolymer (I) is the fluorine-containing polymer of the formula (1) and the structural unit M is a structural unit M3 derived from a fluorine-containing ethylenic monomer and represented by the formula (M3):

(M3)

wherein Rf is an organic group in which 1 to 3 of $Y^1$ ($Y^1$ is a monovalent organic group having 2 to 10 carbon atoms and an ethylenic carbon-carbon double bond at its end) are bonded to a fluorine-containing alkyl group having 1 to 40 carbon atoms or a fluorine-containing alkyl group having 2 to 100 carbon atoms and ether bond.

22. The optical waveguide type functional device of claim 18, wherein at least one of $Y^1$ of Rf in said formula (M) is bonded to an end of Rf.

23. The optical waveguide type functional device of claim 22, wherein $Y^1$ of Rf in said formula (M) is:

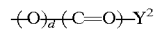

wherein $Y^2$ is an alkenyl group or fluorine-containing alkenyl group having 2 to 5 carbon atoms and an ethylenic carbon-carbon double bond at its end; d and e are the same or different and each is 0 or 1.

24. The optical waveguide type functional device of claim 22, wherein $Y^1$ of Rf in said formula (M) is:

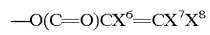

wherein $X^6$ is H, F, $CH_3$ or $CF_3$; $X^7$ and $X^8$ are the same or different and each is H or F.

25. The optical waveguide type functional device of claim 14, wherein a maximum absorption coefficient of the cured article is not more than 1 $cm^{-1}$ in a wavelength range of from 1,290 to 1,320 nm.

26. The optical waveguide type functional device of claim 14, wherein a maximum absorption coefficient of the cured article is not more than 1 $cm^{-1}$ in a wavelength range of from 1,530 to 1,570 nm.

27. An optical waveguide device produced by connecting optical functional devices with the optical waveguide of claim 1.

28. A method of producing an optical waveguide device comprising the following steps (A) to (C):

(A) a step for forming a clad portion on a substrate, (B) a step for forming, on said clad portion, a film of fluorine-containing waveguide material comprising a curable fluorine-containing prepolymer (1) which:

(1) is a non-crystalline polymer having a fluorine content of not less than 25% by weight, (2) has a carbon-carbon double bond in the polymer side chain and/or at an end of the polymer trunk chain, and (3) has a number average molecular weight of 5000 to 100000 and an active energy curing initiator (II), and (C) a step for forming a core portion comprising a cured article of the fluorine-containing prepolymer (I) by irradiating the film of fluorine-containing waveguide material with active energy ray.

* * * * *